United States Patent
Jung et al.

(10) Patent No.: US 12,432,635 B2
(45) Date of Patent: Sep. 30, 2025

(54) ELECTRONIC DEVICE FOR WLAN COMMUNICATION WITH PLURALITY OF EXTERNAL DEVICES AND OPERATION METHOD THEREOF

(71) Applicant: Samsung Electronics Co., Ltd., Suwon-si (KR)

(72) Inventors: Buseop Jung, Suwon-si (KR); Hyejung Bang, Suwon-si (KR); Namju Cho, Suwon-si (KR); Sunkee Lee, Suwon-si (KR); Junsu Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 384 days.

(21) Appl. No.: 18/156,613

(22) Filed: Jan. 19, 2023

(65) Prior Publication Data
US 2023/0189104 A1    Jun. 15, 2023

Related U.S. Application Data

(63) Continuation of application No. PCT/KR2022/019867, filed on Dec. 8, 2022.

(30) Foreign Application Priority Data

Dec. 14, 2021  (KR) ......................... 10-2021-0178662
Jan. 25, 2022  (KR) ......................... 10-2022-0010576

(51) Int. Cl.
*H04W 36/00*    (2009.01)
*H04W 36/08*    (2009.01)
(Continued)

(52) U.S. Cl.
CPC ....... *H04W 36/08* (2013.01); *H04W 36/0072* (2013.01); *H04W 76/14* (2018.02); *H04W 84/12* (2013.01)

(58) Field of Classification Search
None
See application file for complete search history.

(56) References Cited

U.S. PATENT DOCUMENTS 9,137,751 B2   9/2015  Huang
9,652,192 B2   5/2017  Bhamidipati et al.
(Continued)

FOREIGN PATENT DOCUMENTS

EP    3 637 891 A1   4/2020
EP    3 863 366 A1   8/2021
(Continued)

OTHER PUBLICATIONS

European Search Report dated Dec. 9, 2024, issued in European Application No. 22907837.3.
(Continued)

*Primary Examiner* — Suhail Khan
(74) *Attorney, Agent, or Firm* — Jefferson IP Law, LLP

(57) ABSTRACT

An electronic device is provided. The electronic device includes a WLAN communication circuit supporting a plurality of frequency bands, and at least one processor. The at least one processor may be configured to perform WLAN communication with a first AP through a first channel of a first frequency band, to when an external device for performing WLAN-based direct communication is detected during the WLAN communication with the first AP, check capability of the external device and/or WLAN connection information of the external device, to switch the WLAN communication with the first AP to WLAN communication with a second AP based on a second channel of a second frequency band different from the first frequency band, based on the capability of the external device and/or the WLAN connection information of the external device, and
(Continued)

AP 1
(200)

ELECTRONIC DEVICE
(101)

EXTERNAL DEVICE
(210)

to perform direct communication with the external device through the second channel of the second frequency band.

16 Claims, 17 Drawing Sheets

(51) Int. Cl.
  *H04W 76/14* (2018.01)
  *H04W 84/12* (2009.01)

(56) References Cited

U.S. PATENT DOCUMENTS

| | | |
|---|---|---|
| 9,992,805 B2 | 6/2018 | Joshi |
| 10,298,673 B2 | 5/2019 | Hegde et al. |
| 10,743,358 B1 | 8/2020 | Mullati et al. |
| 10,798,707 B2 | 10/2020 | Huang et al. |
| 10,932,275 B2 | 2/2021 | Agrawal et al. |
| 11,026,004 B2 | 6/2021 | Das |
| 2005/0036469 A1 | 2/2005 | Wentink |
| 2013/0329693 A1 | 12/2013 | Lee et al. |
| 2016/0037504 A1* | 2/2016 | Tamura ............... H04W 76/14 370/336 |
| 2017/0245276 A1 | 8/2017 | Kim et al. |
| 2018/0206279 A1 | 7/2018 | Lee et al. |
| 2018/0249111 A1 | 8/2018 | Kim et al. |
| 2019/0098566 A1 | 3/2019 | Li et al. |
| 2019/0182736 A1 | 6/2019 | Jung et al. |
| 2020/0120453 A1 | 4/2020 | Kim et al. |
| 2020/0288521 A1 | 9/2020 | Bang et al. |
| 2021/0392705 A1 | 12/2021 | Jeong et al. |
| 2021/0399830 A1 | 12/2021 | Nakajima |
| 2022/0312513 A1 | 9/2022 | Chitrakar et al. |

FOREIGN PATENT DOCUMENTS

| | | |
|---|---|---|
| JP | 6599541 B2 | 10/2019 |
| JP | 2020-150333 A | 9/2020 |
| JP | 6766993 B2 | 10/2020 |
| KR | 10-2014-0017578 A1 | 2/2014 |
| KR | 10-2015-0096281 A | 8/2015 |
| KR | 10-2017-0099665 A | 9/2017 |
| KR | 10-2017-0137347 A | 12/2017 |
| KR | 10-2018-0099267 A | 9/2018 |
| KR | 10-2021-0078221 A | 6/2021 |
| KR | 10-2021-0127633 A | 10/2021 |
| WO | 2021-002802 A1 | 1/2021 |
| WO | 2021/118644 A1 | 6/2021 |

OTHER PUBLICATIONS

International Search Report and Written Opinion dated Mar. 8, 2023, issued in International Patent Application No. PCT/KR2022/019867.

* cited by examiner

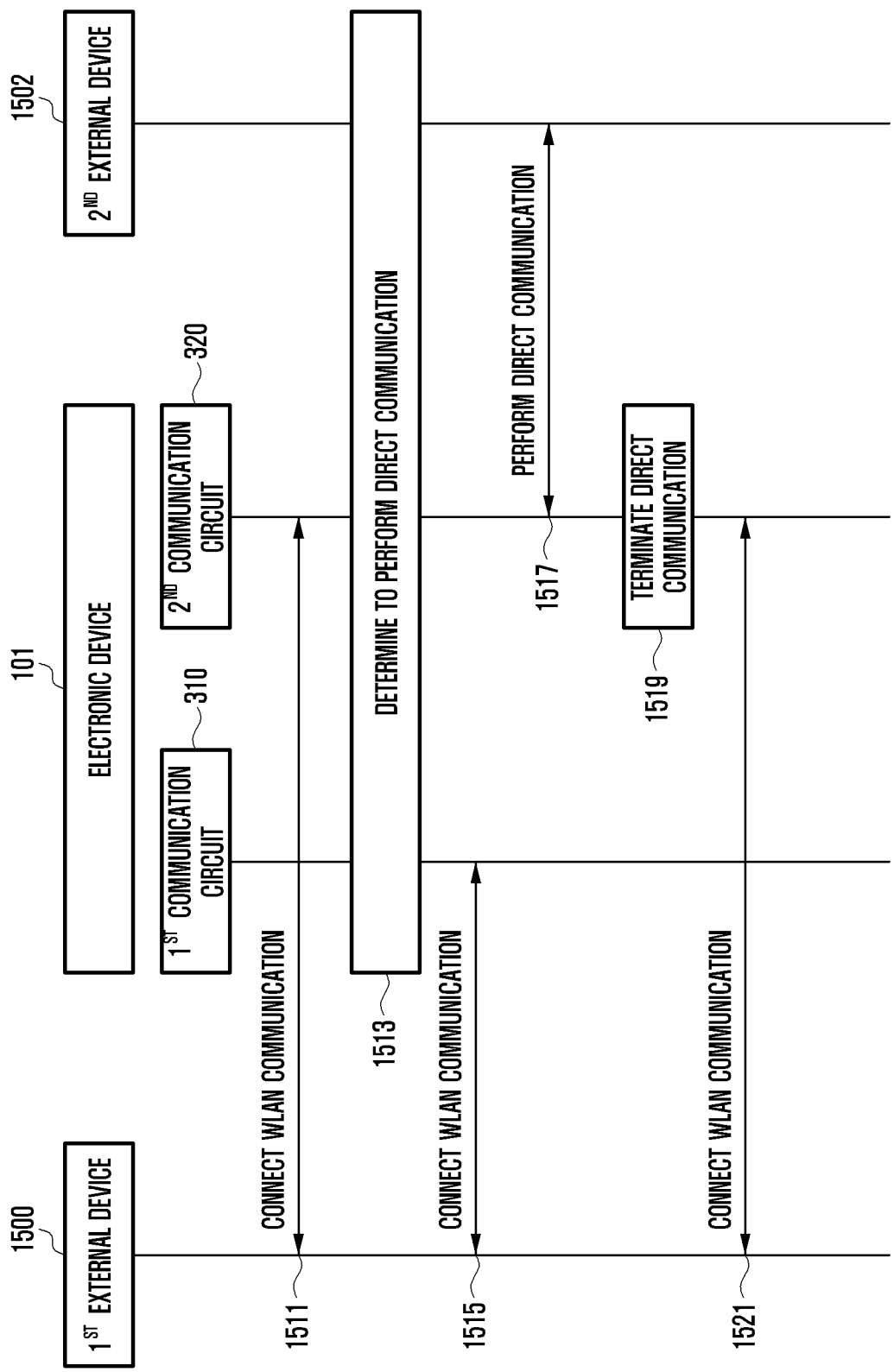

ELECTRONIC DEVICE FOR WLAN COMMUNICATION WITH PLURALITY OF EXTERNAL DEVICES AND OPERATION METHOD THEREOF

CROSS-REFERENCE TO RELATED APPLICATION(S)

This application is a continuation application, claiming priority under § 365(c), of an International application No. PCT/KR2022/019867, filed on Dec. 8, 2022, which is based on and claims the benefit of a Korean patent application number 10-2021-0178662, filed on Dec. 14, 2021, in the Korean Intellectual Property Office, and of a Korean patent application number 10-2022-0010576, filed on Jan. 25, 2022, in the Korean Intellectual Property Office, the disclosure of each of which is incorporated by reference herein in its entirety.

TECHNICAL FIELD

The disclosure relates to an electronic device for wireless local area network (WLAN) communication with a plurality of external devices and an operating method thereof.

BACKGROUND ART

A wireless local area network (WLAN) system can support the wireless connection of various electronic devices such as a smartphone, a tablet personal computer (tablet PC), and a notebook by using a specified frequency band (e.g., about 2.4 giga hertz (GHz) band, about 5 GHz band, and/or about 6 GHz band).

The WLAN system may be installed not only in a private space such as a home, but also in a public space such as an airport, a train station, an office, or a department store.

The above information is presented as background information only to assist with an understanding of the disclosure. No determination has been made, and no assertion is made, as to whether any of the above might be applicable as prior art with regard to the disclosure.

DISCLOSURE OF INVENTION

Technical Problem

The electronic device may share contents such as photos, videos, or games with an external device through direct communication (e.g., Wi-Fi Direct) based on the WLAN. For example, the electronic device may transmit mirroring data (e.g., image and/or audio) to the external device through Miracast which is the direct communication (e.g., Wi-Fi Direct) based on the WLAN.

The electronic device may transmit and/or receive data with an access point (AP) while performing the direct communication (e.g., Wi-Fi Direct) with the external device, based on the WLAN. For example, in the case that a channel for the WLAN communication with the AP and a channel for the direct communication with the external device are identical, the electronic device may transmit and/or receive data with the external device and the AP substantially simultaneously.

However, in the case that the channel for the WLAN communication with the AP and the channel for the direct communication with the external device are different, the electronic device cannot transmit and/or receive data with the external device and the AP simultaneously. In this case, the electronic device may alternately perform the WLAN communication with the external device or the AP. When the electronic device provides a low latency service such as real-time screen transmission through the direct communication with the external device, a screen transmitted and/or received in real time with the external device may be deteriorated in quality or interrupted due to communication with the AP.

Aspects of the disclosure are to address at least the above-mentioned problems and/or disadvantages and to provide at least the advantages described below. Accordingly, an aspect of the disclosure is to provide an apparatus and method for WLAN communication with a plurality of external devices in an electronic device.

Additional aspects will be set forth in part in the description which follows and, in part, will be apparent from the description, or may be learned by practice of the presented embodiments.

Solution to Problem

In accordance with an aspect of the disclosure, an electronic device is provided. The electronic device includes a wireless local area network (WLAN) communication circuit supporting a plurality of frequency bands, and at least one processor operatively connected to the WLAN communication circuit. The at least one processor may be configured to perform WLAN communication with a first access point (AP) through a first channel of a first frequency band, to when an external device for performing WLAN-based direct communication is detected during the WLAN communication with the first AP, check at least one of a capability of the external device or WLAN connection information of the external device, to switch the WLAN communication with the first AP to WLAN communication with a second AP based on a second channel of a second frequency band different from the first frequency band, based on the capability of the external device and/or the WLAN connection information of the external device, and to perform direct communication with the external device through the second channel of the second frequency band.

In accordance with another aspect of the disclosure, an operation method of an electronic device is provided. The operation method includes performing wireless local area network (WLAN) communication with a first access point (AP) through a first channel of a first frequency band among a plurality of frequency bands supported by the electronic device, when an external device for performing WLAN-based direct communication is detected during the WLAN communication with the first AP, checking at least one of a capability of the external device or WLAN connection information of the external device, switching the WLAN communication with the first AP to WLAN communication with a second AP based on a second channel of a second frequency band different from the first frequency band, based on the capability of the external device and/or the WLAN connection information of the external device, and performing direct communication with the external device through the second channel of the second frequency band.

In accordance with another aspect of the disclosure, an electronic device is provided. The electronic device includes a wireless local area network (WLAN) communication circuit supporting a plurality of frequency bands, and at least one processor operatively connected to the WLAN communication circuit. The at least one processor may be configured to perform WLAN communication with a first external device through a first channel of a first frequency band, when a second external device for performing WLAN-based direct communication is detected during the WLAN communication with the first external device, check at least one of a capability of the second external device or information related to a quality of service (QoS) for direct communication with the second external device, change the WLAN communication with the first external electronic device to a second channel of a second frequency band different from the first frequency band, based on at least one of the capability of the second external device or the information related to the QoS for the direct communication with the second external device, and perform the direct communication with the second external device through the first channel of the first frequency band.

According to various embodiments of the disclosure, in the case of performing the direct communication with the second external device based on the WLAN during the WLAN communication with the first external device (e.g., an access point (AP)), the electronic device can provide the WLAN communication based on the communication performance required by the second external device, while performing the WLAN communication with the first external device, by changing the frequency band and/or channel for the WLAN communication with the first external device based on the capability and/or WLAN connection information of the second external device.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF DRAWINGS

The above and other aspects, features, and advantages of certain embodiments of the disclosure will be more apparent from the following description taken in conjunction with the accompanying drawings, in which:

FIG. 15 illustrates yet another example for WLAN communication with a plurality of external devices in an electronic device according to an embodiment of the disclosure.

The same reference numerals are used to represent the same elements throughout the drawings.

MODE FOR THE INVENTION

The following description with reference to the accompanying drawings is provided to assist in a comprehensive understanding of various embodiments of the disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
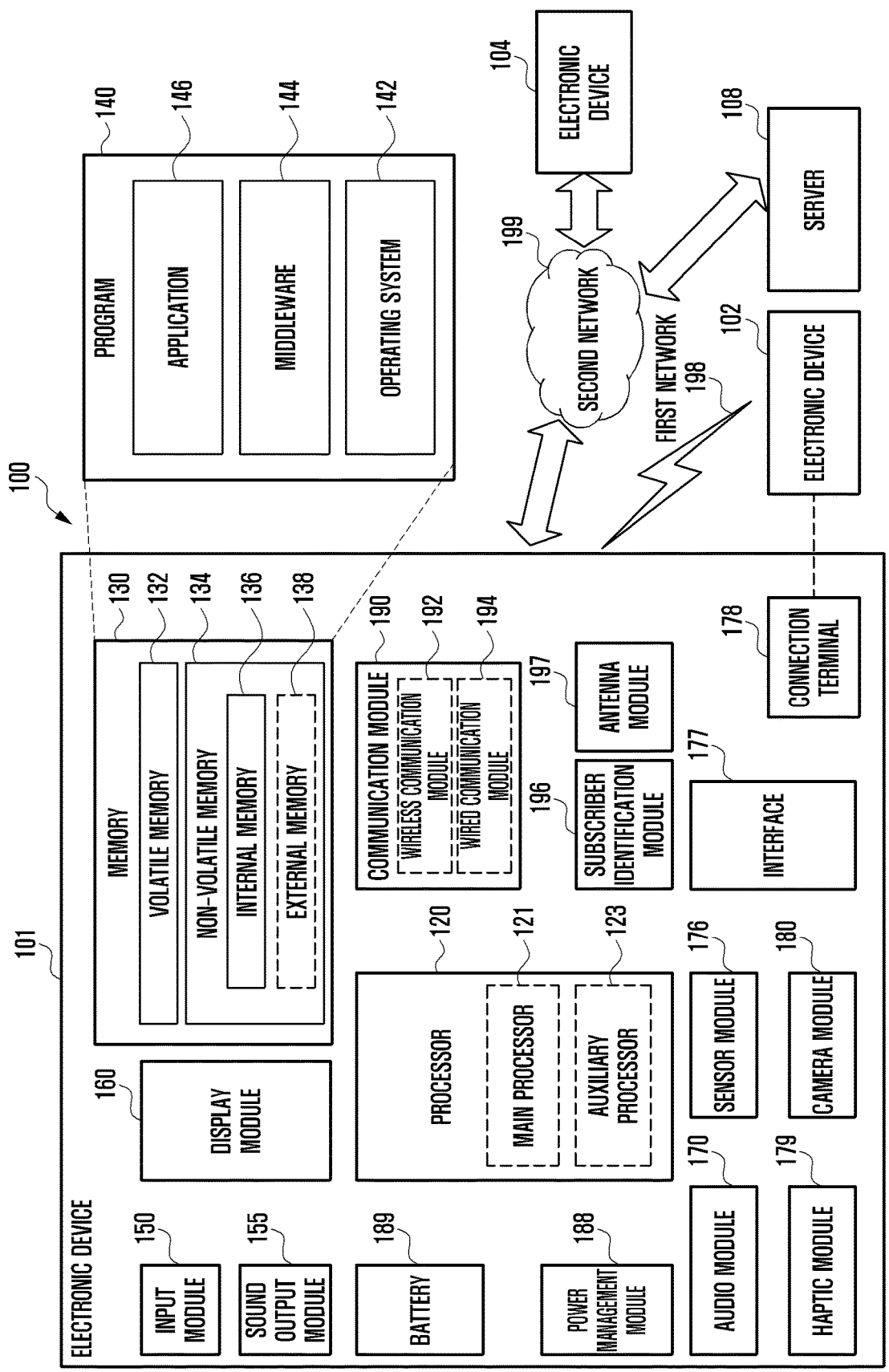
FIG. 1 is a block diagram illustrating an electronic device in a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an external electronic device 102 via a first network 198 (e.g., a short-range wireless communication network), or at least one of an external electronic device 104 or a server 108 via a second network 199 (e.g., a long-range wireless communication network). According to an embodiment, the electronic device 101 may communicate with the external electronic device 104 via the server 108. According to an embodiment, the electronic device 101 may include a processor 120, memory 130, an input module 150, a sound output module 155, a display module 160, an audio module 170, a sensor module 176, an interface 177, a connection terminal 178, a haptic module 179, a camera module 180, a power management module 188, a battery 189, a communication module 190, a subscriber identification module (SIM) 196, or an antenna module 197. In some embodiments, at least one of the components (e.g., the connection terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., the external electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the external electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

The connection terminal 178 may include a connector via which the electronic device 101 may be physically connected with the external electronic device (e.g., the external electronic device 102). According to an embodiment, the connection terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the external electronic device 102, the external electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a fifth-generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a fourth-generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the external electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC. The subscriber identification module 196 may include a plurality of subscriber identification modules. For example, the plurality of subscriber identification modules may store different subscriber information.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a high frequency band (e.g., mmWave) antenna module. According to an embodiment, the high frequency band (e.g., mmWave) antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band. For example, the plurality of antennas may include a patch array antenna and/or a dipole array antenna. For example, the plurality of antennas may include a patch array antenna and/or a dipole array antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 or 104 may be a device of a same type as, or a different type, from the electronic device 101. According to an embodiment, all or some of operations to be executed at the electronic device 101 may be executed at one or more of the external electronic devices 102 and 104 or the server 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2A:
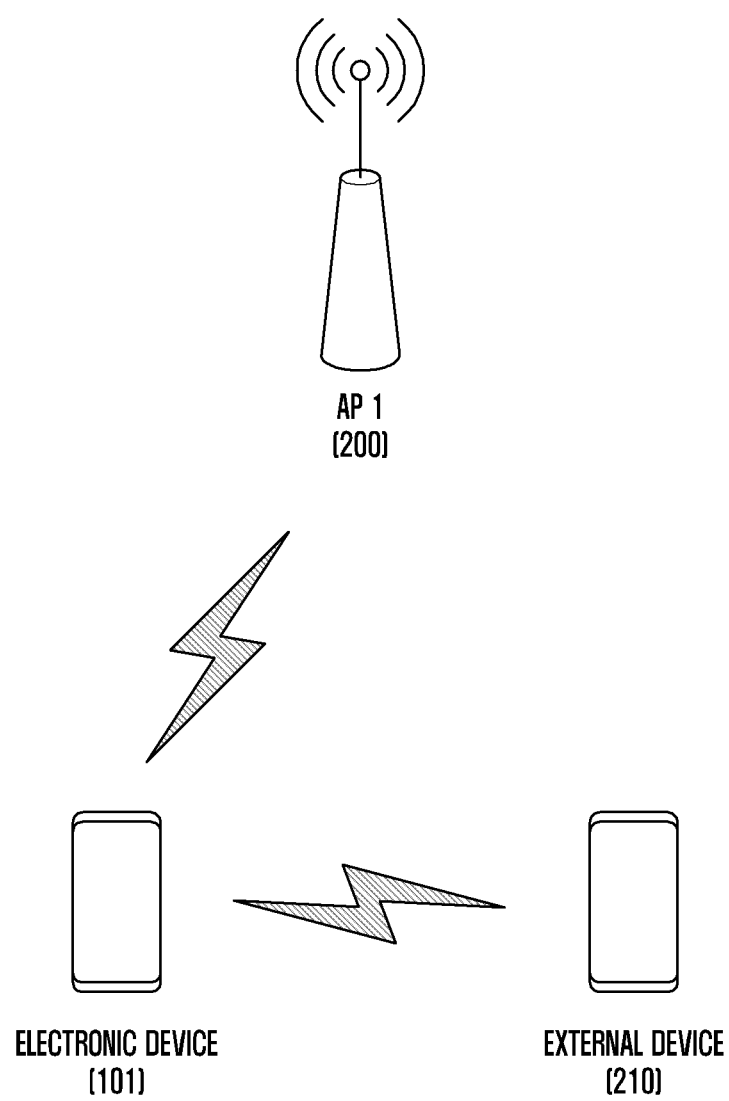
FIG. 2A illustrates one example of a wireless communication system that provides a network of direct communication with an external device and/or wireless communication with an AP according to an embodiment of the disclosure.

FIG. 2A illustrates one example of a wireless communication system that provides a network of direct communication with an external device and/or wireless communication with an AP according to an embodiment of the disclosure.

Figure 2B:
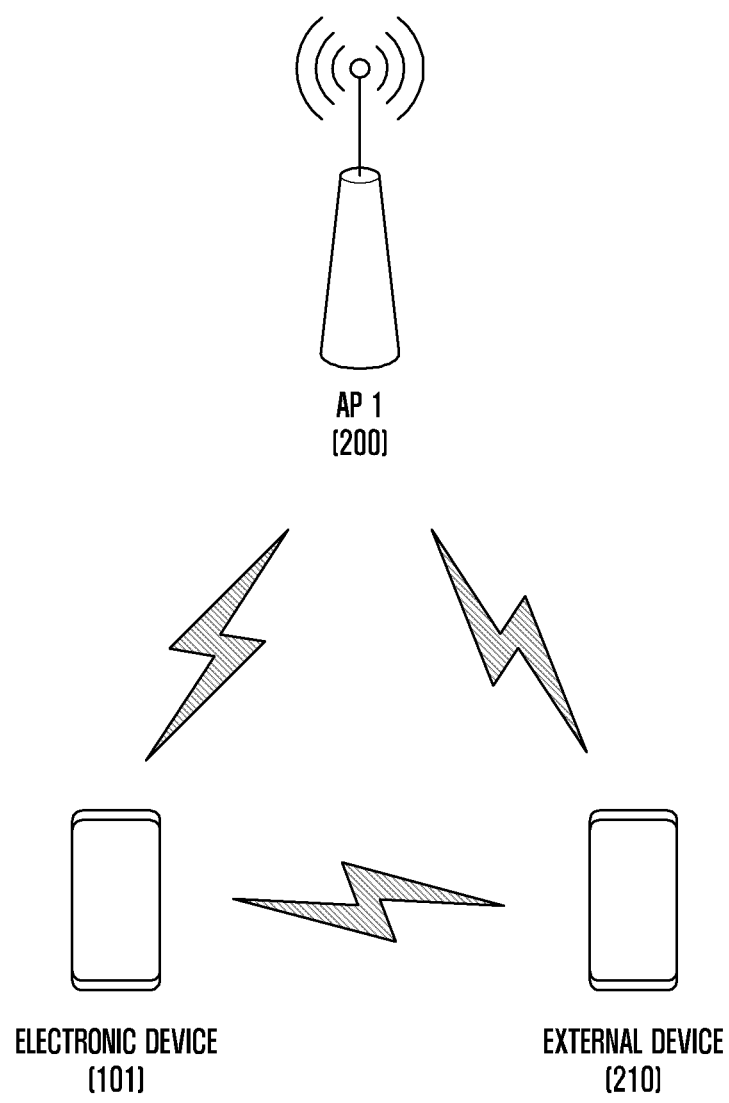
FIG. 2B illustrates another example of a wireless communication system that provides a network of direct communication with an external device and/or wireless communication with an AP according to an embodiment of the disclosure.

FIG. 2B illustrates another example of a wireless communication system that provides a network of direct communication with an external device and/or wireless communication with an AP according to an embodiment of the disclosure.

Figure 2C:
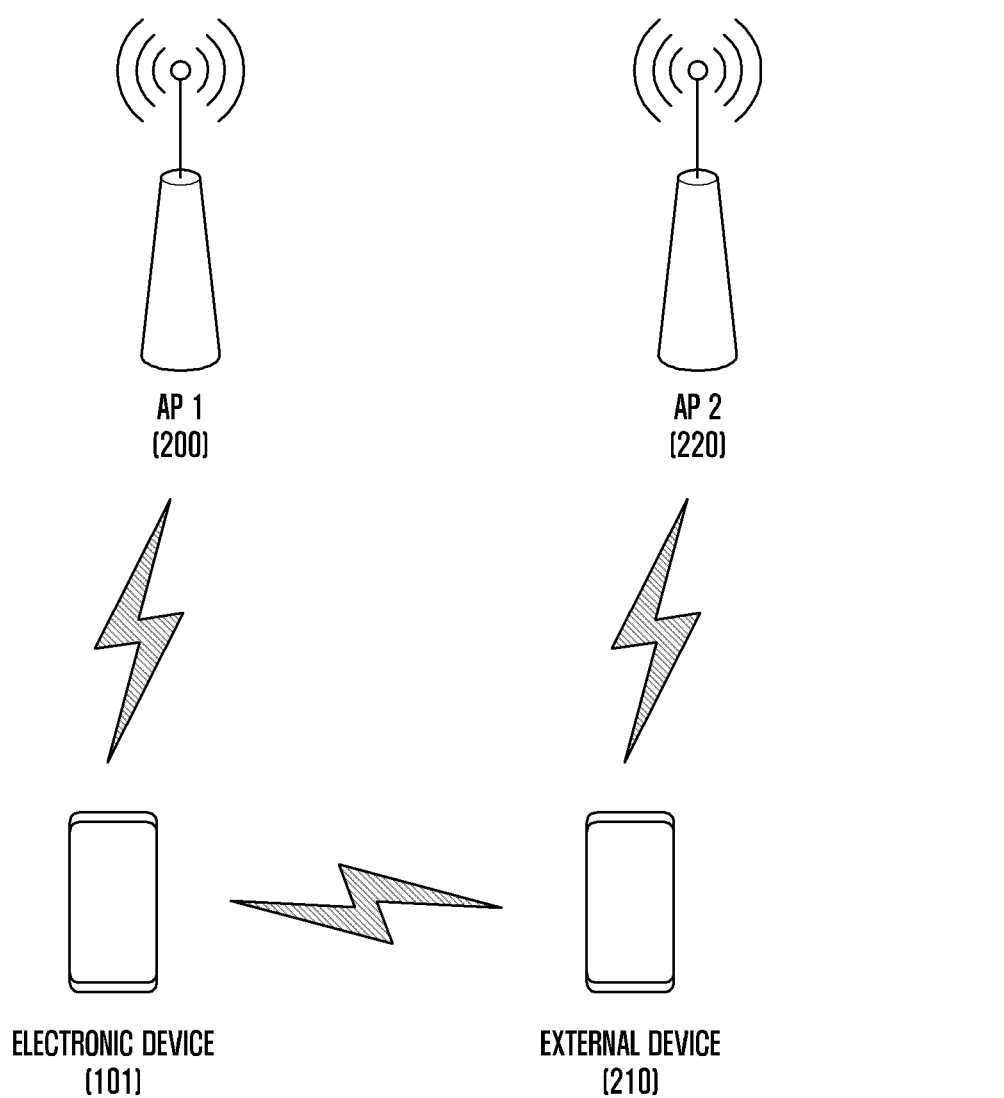
FIG. 2C illustrates still another example of a wireless communication system that provides a network of direct communication with an external device and/or wireless communication with an AP according to an embodiment of the disclosure.

FIG. 2C illustrates still another example of a wireless communication system that provides a network of direct communication with an external device and/or wireless communication with an AP according to an embodiment of the disclosure.

For example, the AP may refer to a network infrastructure device for WLAN communication that supports a specified frequency band (e.g., about 2.4 GHz band, about 5 GHz band, or about 6 GHz band).

Referring to FIGS. 2A, 2B, and 2C, a network environment may include at least one of WLAN-based direct communication or WLAN communication with a network infrastructure device (e.g., an AP, a hotspot, or a router).

Referring to FIG. 2A, an electronic device 101 may access an AP1 200 which is a network infrastructure device for the WLAN communication. According to an embodiment, the electronic device 101 may transmit and/or receive data with the AP1 200 through a first channel of a first frequency band (e.g., about 6 GHz band). For example, the electronic device 101 may use an interface related to a station (STA) for the WLAN communication with the AP1 200.

The electronic device 101 may perform the direct communication (e.g., Wi-Fi Direct) with an external device 210 based on the WLAN. According to an embodiment, the electronic device 101 may use an interface related to a software enabled access point (soft AP) for the WLAN communication with the external device 210. The external device 210 may also use an interface related to a station (STA) for the WLAN communication with the electronic device 101. The electronic device 101 may use the interface related to the STA for the WLAN communication with the external device 210. Alto, the external device 210 may use the interface related to the soft AP for the WLAN communication with the electronic device 101. The electronic device 101 and an electronic device 200 may perform the direct communication based on the WLAN using a peer to peer (P2P) interface.

When the external device 210 for the direct communication is detected during the WLAN communication with the AP1 200, the electronic device 101 may check whether multiple WLAN communication (e.g., multiple Wi-Fi) for the WLAN communication with the AP1 200 and the external device 210 is supportable. For example, the multiple WLAN communication may include a real simultaneous dual band (RSDB) scheme or a dual band simultaneous (DBS) scheme.

Upon determining that the multiple WLAN communication is supported, the electronic device 101 may perform the WLAN communication with the AP1 200 and the external device 210 substantially simultaneously through the multiple WLAN communication. For example, while providing the WLAN communication with the AP1 200 through a first channel of a first frequency band, the electronic device 101 may provide the WLAN communication with the external device 210 through a second channel of a second frequency band.

Upon determining that the multiple WLAN communication is not supported, the electronic device 101 may establish a frequency band for the WLAN communication with the AP1 200 and/or the external device 210 based on capability of the external device 210. Upon determining, based on the capability of the external device 210, that the external device 210 supports the first frequency band being used for the WLAN communication with the AP1 200, the electronic device 100 may establish the first frequency band as a frequency band for the WLAN communication with the external device 210. For example, the electronic device 101 may perform the WLAN communication with the AP1 200 and/or the external device 210 through the first channel of the first frequency band.

Upon determining, based on the capability of the external device 210, that the external device 210 does not support the first frequency band being used for the WLAN communication with the AP1 200, the electronic device 101 may establish, as a frequency band for the WLAN communication with the external device 210, a second frequency band (e.g., about 5 GHz band) different from the first frequency band based on the capability of the external device 210. For example, the electronic device 101 may perform the WLAN communication with the external device 210 through the second channel of the second frequency band. The electronic device 101 may change the frequency band and/or channel for the WLAN communication with a network infrastructure device (e.g., the AP1 200) to the second channel of the second frequency band. For example, a change of the frequency band and/or channel for the WLAN communication with the network infrastructure device may include a series of operations of changing in which the electronic device 101 changes the network infrastructure device for performing the WLAN communication from the AP1 200 supporting the first frequency band to another AP (e.g., an AP2 220 in FIG. 2C) supporting the second frequency band (or the second channel of the second frequency band).

Referring to FIG. 2B, the external device 210 may access the AP1 200 which is a network infrastructure device for the WLAN communication. For example, for the WLAN communication with the AP1 200, the external device 210 may use an interface related to a station (STA).

When the external device 210 for the direct communication is detected during the WLAN communication with the AP1 200, the electronic device 101 may check whether multiple WLAN communication (e.g., multiple Wi-Fi) for the WLAN communication with the AP1 200 and the external device 210 is supportable. Upon determining that the multiple WLAN communication is not supported, the electronic device 101 may establish a frequency band for the WLAN communication with the AP1 200 and/or the external device 210 based on capability of the external device 210 and/or WLAN connection information between the external device 210 and the AP1 200. For example, the WLAN connection information between the external device 210 and the AP1 200 may include information related to a frequency band and/or channel for the WLAN communication between the external device 210 and the AP1 200.

Upon determining, based on the capability of the external device 210 and/or the WLAN connection information between the external device 210 and the AP1 200, that the external device 210 supports the first frequency band, the electronic device 100 may establish the first frequency band as a frequency band for the WLAN communication with the external device 210. For example, the electronic device 101 may perform the WLAN communication with the AP1 200 and/or the external device 210 through the first channel of the first frequency band.

Upon determining, based on the capability of the external device 210 and/or the WLAN connection information between the external device 210 and the AP1 200, that the external device 210 does not support the first frequency band, the electronic device 101 may establish, as a frequency band for the WLAN communication with the external device 210, a second frequency band (e.g., about 5 GHz band) different from the first frequency band based on the capability of the external device 210. For example, the electronic device 101 may perform the WLAN communication with the external device 210 through the second channel of the second frequency band. The electronic device 101 may change the frequency band and/or channel for the WLAN communication with a network infrastructure device (e.g., the AP1 200) to the second channel of the second frequency band. For example, the electronic device 101 may change the network infrastructure device for performing the WLAN communication from the AP1 200 to another AP (e.g., an AP2 220 in FIG. 2C) supporting the second frequency band (or the second channel of the second frequency band).

Referring to FIG. 2C, the external device 210 may access the AP2 220 which is a network infrastructure device for the WLAN communication. For example, for the WLAN communication with the AP2 220, the external device 210 may use an interface related to a station (STA).

When the external device 210 for the direct communication is detected during the WLAN communication with the AP1 200, the electronic device 101 may check whether multiple WLAN communication (e.g., multiple Wi-Fi) for the WLAN communication with the AP1 200 and the external device 210 is supportable. Upon determining that the multiple WLAN communication is not supported, the electronic device 101 may establish a frequency band for the WLAN communication with the AP1 200 and/or the external device 210 based on capability of the external device 210 and/or WLAN connection information between the external device 210 and the AP2 220. For example, the WLAN connection information between the external device 210 and the AP2 220 may include information related to a frequency band and/or channel for the WLAN communication between the external device 210 and the AP2 220.

Upon determining, based on the capability of the external device 210 and/or the WLAN connection information between the external device 210 and the AP2 220, that the external device 210 supports the first frequency band, the electronic device 100 may establish the first frequency band as a frequency band for the WLAN communication with the external device 210. For example, the electronic device 101 may perform the WLAN communication with the AP1 200 and/or the external device 210 through the first channel of the first frequency band.

Upon determining, based on the capability of the external device 210 and/or the WLAN connection information between the external device 210 and the AP2 220, that the external device 210 does not support the first frequency band, the electronic device 101 may establish, as a frequency band for the WLAN communication with the external device 210, a second frequency band (e.g., about 5 GHz band) different from the first frequency band based on the capability of the external device 210. For example, the electronic device 101 may perform the WLAN communication with the external device 210 through the second channel of the second frequency band. The electronic device 101 may change the frequency band and/or channel for the WLAN communication with a network infrastructure device (e.g., the AP1 200) to the second channel of the second frequency band. For example, the electronic device 101 may change the network infrastructure device for performing the WLAN communication from the AP1 200 to another AP (e.g., the AP2 220 in FIG. 2C) supporting the second frequency band (or the second channel of the second frequency band).

Figure 3:
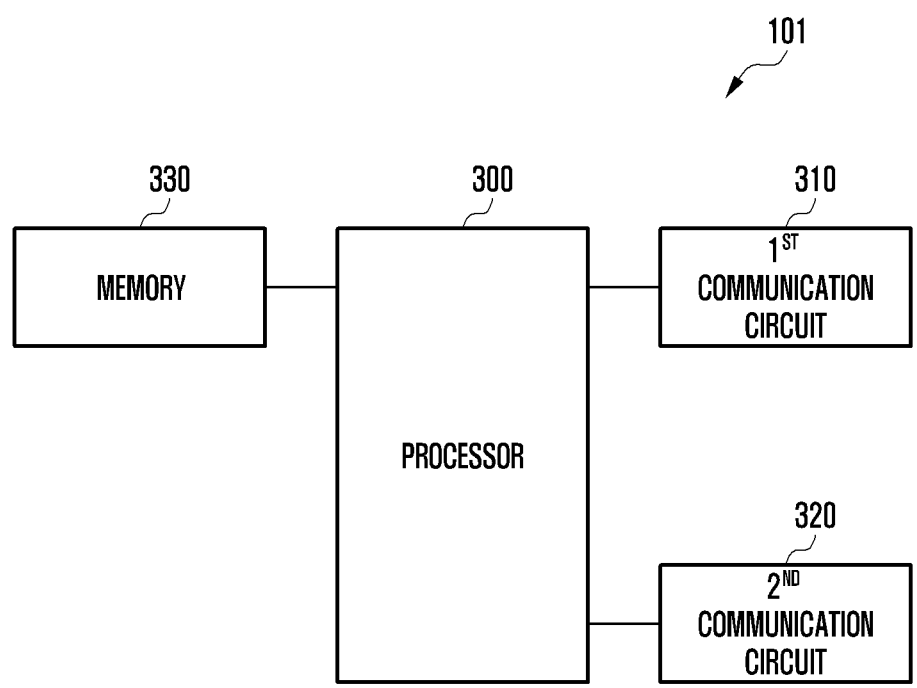
FIG. 3 is a block diagram illustrating an electronic device for WLAN communication with a plurality of external devices according to an embodiment of the disclosure.

FIG. 3 is a block diagram illustrating an electronic device for WLAN communication with a plurality of external devices according to an embodiment of the disclosure.

Referring to FIG. 3, the electronic device 101 may include a processor (e.g., including processing circuitry) 300, a first communication circuit 310, a second communication circuit 320, and/or a memory 330. The processor 300 may be substantially identical to or included in the processor 120 of FIG. 1. The first communication circuit 310 and/or the second communication circuit 320 may be substantially identical to or included in the wireless communication module 192 of FIG. 1. The memory 330 may be substantially identical with or included in the memory 130 of FIG. 1. The processor 300 may be connected operatively, functionally, and/or electrically to the first communication circuit 310, the second communication circuit 320, and/or the memory 330.

The first communication circuit 310 and the second communication circuit 320 may transmit and/or receive signals and/or data with an AP (e.g., the AP1 200 in FIGS. 2A, 2B, and 2C) and/or at least one external device (e.g., the external device 210 in FIGS. 2A, 2B, and 2C) through wireless local area network (WLAN) communication. The first communication circuit 310 and the second communication circuit 320 may be configured with software for processing signals and protocols of different frequency bands. For example, the first communication circuit 310 and the second communication circuit 320 may be logically (e.g., software) divided. The first communication circuit 310 and the second communication circuit 320 may be configured with different circuits or different hardware. For example, the first communication circuit 310 may support a band of about 2.4 GHz and a band of about 5 GHz, and the second communication circuit 320 may support a band of about 5 GHz and a band of about 6 GHz. For example, the first communication circuit 310 may support a band of about 2.4 GHz, and the second communication circuit 320 may support a band of about 5 GHz and a band of about 6 GHz. The first communication circuit 310 may support a band of about 2.4 GHz and a band of about 5 GHz band, and the second communication circuit 320 may support a band of about 6 GHz. For example, the WLAN communication is short-range wireless communication, and may include Wi-Fi.

The processor 300 may control the first communication circuit 310 or the second communication circuit 320 to perform the WLAN communication with the AP1 200 which is a network infrastructure device for the WLAN communication. The processor 300 may control the second communication circuit 320 to transmit and/or receive data with the AP1 200 through a first channel of a first frequency band (e.g., about 6 GHz band). For example, the first frequency band and/or the first channel may be allocated from the AP1 200. For example, the first frequency band and/or the first channel may be established through negotiation with the AP1 200.

When the external device 210 for direct communication based on the WLAN is detected during the WLAN communication with the AP1 200, the processor 300 may control the first communication circuit 310 or the second communication circuit 320 to check the capability of the external device 210 and/or the WLAN connection information of the external device 210. When an application related to the direct communication based on the WLAN is executed, the processor 300 may check, through the first communication circuit 310, the second communication circuit 320, or a separate short-range communication circuit (not shown), whether there is the external device 210 capable of the connection of the direct communication with the electronic device 101. For example, the short-range communication circuit may support short-range communication such as near field communication (NFC), Bluetooth, and/or Bluetooth low energy (BLE).

When the external device 210 capable of the connection of the direct communication with the electronic device 101 is detected, the processor 300 may check the capability of the external device 210 and/or the WLAN connection information of the external device 210, based on a probe request message or a probe response message. For example, the probe request message and/or the probe response message may include the capability of the electronic device 101 or the external device 210, a device name, channel support information, and/or information related to a channel being used for the WLAN communication. For example, the WLAN connection information of the external device 210 may include information related to a frequency band and/or channel being used by the external device 210 for the WLAN communication. When the external device 210 capable of the connection of the direct communication with the electronic device 101 is detected, the processor 300 may check the capability of the external device 210 and/or the WLAN connection information of the external device 210 through an out-of-band (OOB) scheme. For example, through the OOB scheme, the processor 300 may perform an operation of checking whether there is the external device 210 capable of the connection of the direct communication with the electronic device 101, and an operation of checking the capability and/or WLAN connection information of the external device 210. For example, the OOB scheme may include short-range communication such as NFC, Bluetooth, and/or BLE. For example, the OOB scheme may include short-distance communication such as NFC, Bluetooth, and/ or BLE except for WLAN (or WLAN-based direct communication).

Based on the capability of the external device 210 and/or the WLAN connection information of the external device 210, the processor 300 may determine whether a first frequency band is usable for the direct communication with the external device 210. Upon determining, based on the capability of the external device 210, that the external device 210 supports the first frequency band, the processor 300 may determine that the first frequency band is usable for the direct communication with the external device 210. Upon determining, based on the capability of the external device 210, that the external device 210 does not support the first frequency band, the processor 300 may determine that the first frequency band is unusable for the direct communication with the external device 210.

In the case that the external device 210 uses the first frequency band for the WLAN communication with another external device (e.g., the AP1 200 in FIGS. 2A, 2B, and 2C or the AP2 220 in FIG. 2C) based on the WLAN connection information of the external device 210, the processor 300 may determine that the first frequency band is usable for the direct communication with the external device 210.

In the case that the external device 210 uses a second frequency band different from the first frequency band for the WLAN communication with another external device (e.g., the AP1 200 in FIGS. 2A, 2B, and 2C or the AP2 220 in FIG. 2C) based on the WLAN connection information of the external device 210, the processor 300 may check the communication performance of the first and second frequency bands. For example, upon determining that the communication performance of the first frequency band is better than that of the second frequency band, the processor 300 may determine that the first frequency band is usable for the direct communication with the external device 210. For example, upon determining that the communication performance of the second frequency band is better than that of the first frequency band, the processor 300 may determine that the first frequency band cannot be used for the direct communication with the external device 210. For example, the processor 300 may determine that communication performance of a relatively high frequency band in the first frequency band and the second frequency band is relatively good.

Upon determining that the first frequency band is usable for the direct communication with the external device 210, the processor 300 may control the first communication circuit 310 or the second communication circuit 320 to perform the direct communication with the external device 210 through a first channel of the first frequency band. The processor 300 may control the second communication circuit 320 to transmit and/or receive data with the external device 210 through the first channel of the first frequency band (e.g., about 6 GHz band). For example, the processor 300 may control the second communication circuit 320 to perform the WLAN communication with the AP1 200 and/or the external device 210 through the first channel of the first frequency band.

Upon determining that the first frequency band is unusable for the direct communication with the external device 210, the processor 300 may control the first communication circuit 310 or the second communication circuit 320 to perform the WLAN communication with the AP1 200 and/or the external device 210 through a second channel of the second frequency band different from the first frequency band. Upon determining that the first frequency band is unusable for the direct communication with the external device 210, the processor 300 may establish the second frequency band for the direct communication with the external device 210 through negotiation with the external device 210. For example, the processor 300 may control the first communication circuit 310 or the second communication circuit 320 to perform the WLAN communication with the external device 210 through the second frequency band. For example, the processor 300 may control the first communication circuit 310 or the second communication circuit 320 to change the frequency band for the WLAN communication with a network infrastructure device (e.g., the AP1

200) to the second frequency band, based on the direct communication with the external device 210 based on the second frequency band. For example, based on a profile of the AP related to the second frequency band obtained from the external device 210, the processor 200 may change the frequency band for the WLAN communication with the network infrastructure device (e.g., the AP1 200) to the second frequency band. For example, a change of the frequency band for the WLAN communication with the network infrastructure device may include a series of operations in which the electronic device 101 changes the network infrastructure device for performing the WLAN communication from the AP1 200 supporting the first frequency band to another AP (e.g., an AP2 220 in FIG. 2C) supporting the second frequency band (or the second channel of the second frequency band).

In the case of changing the frequency band for the WLAN communication with the network infrastructure device (e.g., the AP1 200) to the second frequency band, the processor 300 may control the first communication circuit 310 or the second communication circuit 320 to change the frequency band for the WLAN communication with the network infrastructure device to the first frequency band, based on a release of connection of the direct communication with the external device 210. In the case that the connection of the direct communication with the external device 210 based on the second frequency band is released, the processor 300 may control the second communication circuit 320 to change (or restore) the network infrastructure device, through which the electronic device 101 performs the WLAN communication, to the AP1 200 that supports the first frequency band (or the first channel of the first frequency band).

The processor 300 may control the first communication circuit 310 or the second communication circuit 320 to perform the WLAN-based direct communication with a first external device through the first channel of the first frequency band (e.g., about 6 GHz band).

When a second external device for the WLAN-based direct communication is detected during the WLAN-based direct communication with the first external device, the processor 300 may check the capability of the second external device and/or the quality of service (QoS) for the direct communication with the second external device. The processor 300 may check the capability of the second external device based on a probe request message or a probe response message transmitted and/or received with the second external device. For example, the QoS for the direct communication with the second external device may include the QoS required by an application related to the direct communication with the second external device. When the second external device capable of the connection of the direct communication with the electronic device 101 is detected, the processor 300 may check information on the capability of the second external device and/or the QoS for the direct communication with the second external device through the OOB scheme.

The processor 300 may control the first communication circuit 310 or the second communication circuit 320 to change the frequency band for the direct communication with the first external device to the second frequency band different from the first frequency band, based on the capability of the second external device and/or the QoS for the direct communication with the second external device. Upon determining that the second external device supports the first frequency band and the QoS for the direct communication with the second external device satisfies a specified quality condition, the processor 300 may control the first communication circuit 310 or the second communication circuit 320 to change the frequency band for the direct communication with the first external device to the second frequency band. The processor 300 may control the first communication circuit 310 or the second communication circuit 320 to perform the WLAN-based direct communication with the second external device through the first frequency band. For example, the first frequency band may include a relatively higher frequency band than the second frequency band.

The memory 330 may store various data used by at least one component (e.g., the processor 300, the first communication circuit 310, and/or the second communication circuit 320) of the electronic device 101. According to an embodiment, the memory 330 may store various instructions that are executable through the processor 300.

According to various embodiments of the disclosure, an electronic device (e.g., the electronic device 101 in FIG. 1, 2A, 2B, 2C, or 3) may include a wireless local area network (WLAN) communication circuit (e.g., the wireless communication module 192 in FIG. 1 or the first communication circuit 310 or the second communication circuit 320 in FIG. 3) supporting a plurality of frequency bands, and at least one processor (e.g., the processor 120 in FIG. 1 or the processor 300 in FIG. 3) operatively connected to the WLAN communication circuit. The at least one processor may be configured to perform WLAN communication with a first access point (AP) through a first channel of a first frequency band, to when an external device for performing WLAN-based direct communication is detected during the WLAN communication with the first AP, check capability of the external device and/or WLAN connection information of the external device, to switch the WLAN communication with the first AP to WLAN communication with a second AP based on a second channel of a second frequency band different from the first frequency band, based on the capability of the external device and/or the WLAN connection information of the external device, and to perform direct communication with the external device through the second channel of the second frequency band.

The at least one processor may be configured to determine whether to use the first frequency band for the direct communication with the external device, based on the capability of the external device and/or the WLAN connection information of the external device, to upon determining that the first frequency band is not used for the direct communication with the external device, switch the WLAN communication with the first AP to the WLAN communication with the second AP based on the second channel of the second frequency band, and to perform the direct communication with the external device through the second channel of the second frequency band.

The at least one processor may be configured to determine not to use the first frequency band for the direct communication with the external device when the external device does not support the first frequency band based on the capability of the external device.

The at least one processor may be configured to determine to use the first frequency band for the direct communication with the external device when the external device supports the first frequency band based on the capability of the external device, and to perform the direct communication with the external device through the first channel of the first frequency band, based on determining to use the first frequency band for the direct communication with the external device.

The at least one processor may be configured to, upon determining to use the first frequency band for the direct communication with the external device, maintain WLAN connection with the first AP based on the first channel of the first frequency band.

The at least one processor may be configured to check a frequency band being used by the external device for WLAN communication with a third AP based on the WLAN connection information of the external device, and to determine not to use the first frequency band for the WLAN communication with the external device when the frequency band being used by the external device for the WLAN communication with the third AP is different from the first frequency band.

The at least one processor may be configured to perform the direct communication with the external device through the first channel of the first frequency band when the external device uses the first frequency band for the WLAN communication with the third AP.

The electronic device may further include a display, and the at least one processor may be configured to display information related to switching to the WLAN communication with the second AP through the display in case of switching the WLAN communication with the first AP to the WLAN communication with the second AP based on the second channel of the second frequency band.

The electronic device may further include a display, and the at least one processor may be configured to display information related to switching to the WLAN communication with the second AP through the display upon determining to switch the WLAN communication with the first AP to the WLAN communication with the second AP based on the second channel of the second frequency band, and to switch the WLAN communication with the first AP to the WLAN communication with the second AP based on the second channel of the second frequency band in response to an input corresponding to the information related to switching to the WLAN communication with the second AP displayed on the display.

The at least one processor may be configured to acquire a profile related to the second frequency band from the external device, and to, based on the profile related to the second frequency band acquired from the external device, switch the WLAN communication with the first AP to the WLAN communication with the second AP based on the second channel of the second frequency band.

According to various embodiments of the disclosure, an electronic device (e.g., the electronic device 101 in FIG. 1, 2A, 2B, 2C, or 3) may include a wireless local area network (WLAN) communication circuit (e.g., the wireless communication module 192 in FIG. 1 or the first communication circuit 310 or the second communication circuit 320 in FIG. 3) supporting a plurality of frequency bands, and at least one processor (e.g., the processor 120 in FIG. 1 or the processor 300 in FIG. 3) operatively connected to the WLAN communication circuit. The at least one processor may be configured to perform WLAN communication with a first external device through a first channel of a first frequency band, to when a second external device for performing WLAN-based direct communication is detected during the WLAN communication with the first external device, check capability of the second external device and/or information related to a quality of service (QoS) for direct communication with the second external device, to change the WLAN communication with the first external electronic device to a second channel of a second frequency band different from the first frequency band, based on the capability of the second external device and/or the information related to the QoS for the direct communication with the second external device, and to perform the direct communication with the second external device through the first channel of the first frequency band.

The at least one processor may be configured to determine whether to use the first frequency band for the direct communication with the second external device, based on the QoS for the direct communication with the second external device and a QoS for the WLAN communication with the first external device, to upon determining that the first frequency band is used for the direct communication with the second external device, change the WLAN communication with the first external device to the second channel of the second frequency band different from the first frequency band, and to perform the direct communication with the second external device through the first channel of the first frequency band.

The WLAN communication with the first external device may include WLAN communication of a software enabled access point (soft AP) scheme, a mobile hotspot scheme, or a mobile AP scheme.

The first frequency band may include a frequency band higher than the second frequency band.

Figure 4:
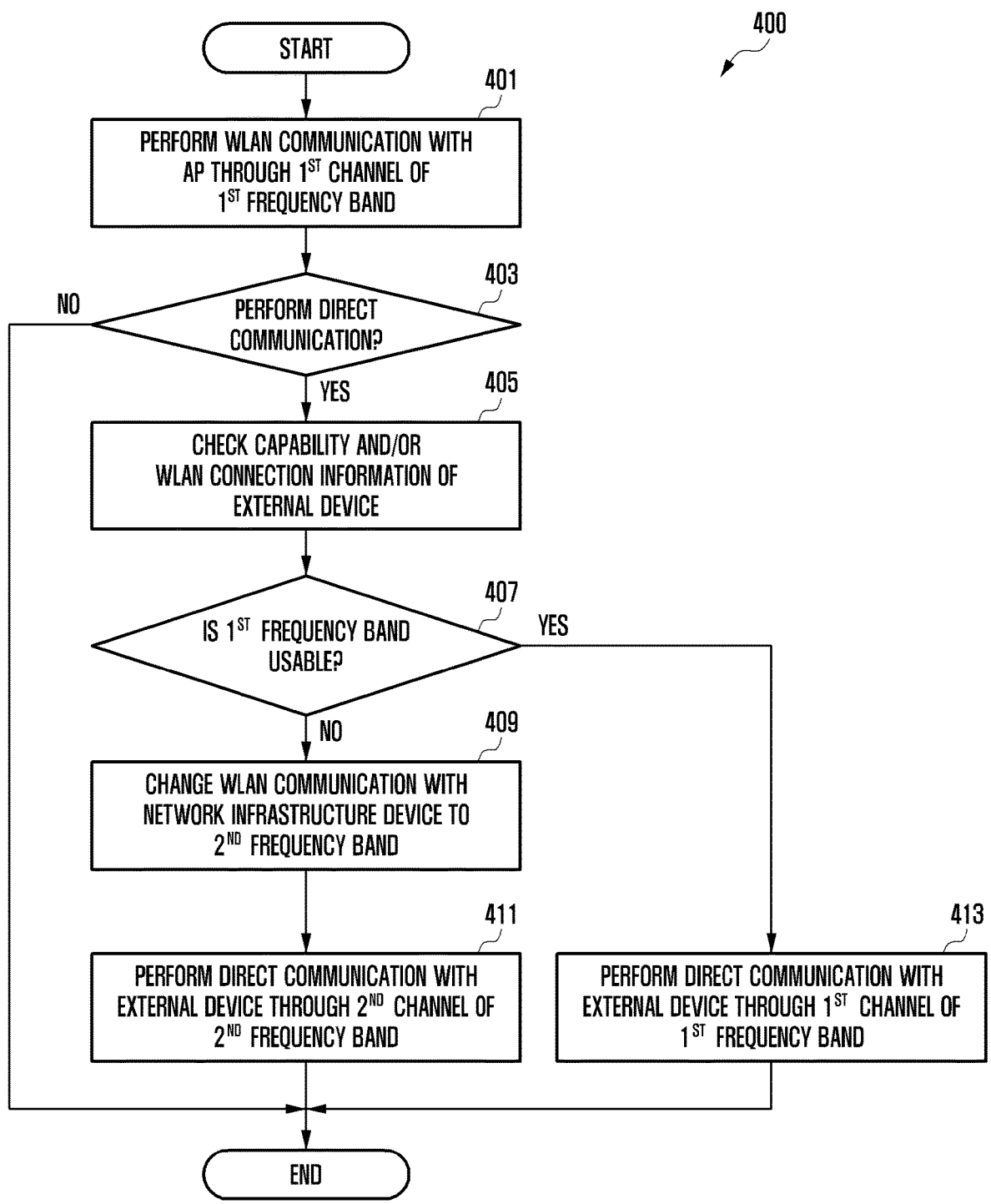
FIG. 4 is a flowchart for WLAN communication with a plurality of external devices in an electronic device according to an embodiment of the disclosure.

FIG. 4 is a flowchart 400 for WLAN communication with a plurality of external devices in an electronic device according to an embodiment of the disclosure.

Referring to FIG. 4, the respective operations may be performed sequentially, but are not necessarily performed sequentially. For example, the order of the respective operations may be changed, and at least two operations may be performed in parallel. For example, the electronic device of FIG. 4 may be the electronic device 101 of FIG. 1, 2A, 2B, 2C, or 3.

Referring to FIG. 4, at operation 401, the electronic device (e.g., the processor 120 in FIG. 1 or the processor 300 in FIG. 3) may perform WLAN communication with the AP1 200, which is a network infrastructure device for the WLAN communication, through a first channel of a first frequency band. The processor 300 may control the second communication circuit 320 to transmit and/or receive data with the AP1 200 through the first channel of the first frequency band (e.g., about 6 GHz band). For example, the first frequency band and/or the first channel may be allocated from the AP1 200.

At operation 403, the electronic device (e.g., the processor 120 or 300) may check whether the external device 210 for performing the WLAN-based direct communication is detected during the WLAN communication with the AP1 200. When an application related to the WLAN-based direct communication is executed, the processor 300 may check, through the first communication circuit 310, the second communication circuit 320, or a separate short-range communication circuit (not shown), whether there is the external device 210 capable of the connection of the direct communication with the electronic device 101. For example, the short-range communication circuit may support short-range communication such as NFC, Bluetooth, and/or BLE. Through the first communication circuit 310, the second communication circuit 320, or the separate short-range communication circuit (not shown), the processor 300 may check whether a request message related to the direct communication with the electronic device 101 is received from the external device 210 during the WLAN communication with the AP1 200.

When the external device 210 for performing the WLAN-based direct communication is not detected (e.g., 'No' of operation 403), the electronic device (e.g., the processor 120 or 300) may terminate the WLAN communication.

When the external device 210 for performing the WLAN-based direct communication is detected (e.g., 'Yes' of operation 403), the electronic device (e.g., the processor 120 or 300) may check, at operation 405, the capability of the external device 210 and/or the WLAN connection information of the external device 210. When the external device 210 capable of the connection of the direct communication with the electronic device 101 is detected, the processor 300 may check the capability of the external device 210 and/or the WLAN connection information of the external device 210 through an out-of-band (OOB) scheme. For example, the OOB scheme may include short-range communication such as NFC, Bluetooth, and/or BLE. For example, the OOB scheme may include short-distance communication such as NFC, Bluetooth, and/or BLE except for WLAN (or WLAN-based direct communication).

When the external device 210 capable of the connection of the direct communication with the electronic device 101 is detected, the processor 300 may check the capability of the external device 210 and/or the WLAN connection information of the external device 210, based on a probe request message or a probe response message transmitted and/or received with the external device 210. For example, the probe request message and/or the probe response message may include the capability of the electronic device 101 or the external device 210, a device name, channel support information, and/or information related to a channel being used for the WLAN communication. For example, the WLAN connection information of the external device 210 may include information related to a channel being used by the external device 210 for the WLAN communication. For example, the capability of the external device 210 may be configured as shown in Table 1 below.

210, based on the capability of the external device 210 and/or the WLAN connection information of the external device 210. Upon determining, based on the capability of the external device 210, that the external device 210 supports the first frequency band, the processor 300 may determine that the first frequency band is usable for the direct communication with the external device 210. Upon determining, based on the capability of the external device 210, that the external device 210 does not support the first frequency band, the processor 300 may determine that the first frequency band is unusable for the direct communication with the external device 210.

In the case that the external device 210 uses the first frequency band for the WLAN communication with another external device (e.g., the AP1 200 or the AP2 220 in FIGS. 2A, 2B, and 2C) based on the WLAN connection information of the external device 210, the processor 300 may determine that the first frequency band is usable for the direct communication with the external device 210.

In the case that the external device 210 uses a second frequency band different from the first frequency band for the WLAN communication with another external device (e.g., the AP1 200 or the AP2 220 in FIGS. 2A, 2B, and 2C) based on the WLAN connection information of the external device 210, the processor 300 may check the communication performance of the first and second frequency bands. For example, upon determining that the communication performance of the first frequency band is better than that of the second frequency band, the processor 300 may determine that the first frequency band is usable for the direct communication with the external device 210. For example, a state in which the communication performance of the first frequency band is better than that of the second frequency band may include a state in which the first frequency band is a higher frequency band than the second frequency band.

TABLE 1

| Bit(s) | Information | Notes |
|---|---|---|
| 0 | Service Discovery | The Service Discovery field shall be set to 1 if the P2P Device supports Service Discovery, and is set to 0 otherwise. |
| 1 | P2P Client Discoverability | Within a P2P Group Info attribute and a (Re)association frame the P2P Client Discoverability field shall be set to 1 when the P2P Device supports P2P Client Discoverability, and is set to 0 otherwise. This field shall be reserved and set to 0 in all other frames or uses. |
| 2 | Concurrent Operation | The Concurrent Operation field shall be set to 1 when the P2P Device supports Concurrent Operation with WLAN, and is set to 0 otherwise. |
| 3 | P2P Infrastructure Managed | The P2P Infrastructure Managed field shall be set to 1 when the P2P interface of the P2P Device is capable of being managed by the WLAN (infrastructure network) based on P2P Coexistence Parameters, and set to 0 otherwise. |
| 4 | P2P Device Limit | The P2P Device Limit field shall be set to 1 when the P2P Device is unable to participate in additional P2P Groups, and set to 0 otherwise. |
| 5 | P2P Invitation Procedure | The P2P Invitation Procedure field shall be set to 1 if the P2P Device is capable of processing P2P Invitation Procedure signaling, and set to 0 otherwise. |
| 6 | P2P 6 GHz band capable | The P2P 6 GHZ band capable field shall be set to 1 if the P2P Device is capable of P2P group operation in 6 GHz band. |
| 7 | Reserved | — |

For example, the capability of the external device 210 may include information (e.g., P2P 6 GHz band capable) on whether the first frequency band (e.g., about 6 GHz band) is supported.

At operation 407, the electronic device (e.g., the processor 120 or 300) may check whether the first frequency band is usable for the direct communication with the external device For example, upon determining that the communication performance of the second frequency band is better than that of the first frequency band, the processor 300 may determine that the first frequency band cannot be used for the direct communication with the external device 210. For example, a state in which the communication performance of the second frequency band is better than that of the first frequency band may include a state in which the second frequency band is a higher frequency band than the first frequency band.

Upon determining that the first frequency band is unusable for the direct communication with the external device 210 (e.g., 'No' of operation 407), the electronic device (e.g., the processor 120 or 300) may change, at operation 409, the frequency band for the WLAN communication with a network infrastructure device (e.g., AP1 200) to a second channel of the second frequency band. The processor 300 may control the first communication circuit 310 or the second communication circuit 320 to change the network infrastructure device, with which the electronic device 101 performs the WLAN communication, from the AP1 200 supporting the first frequency band to another AP supporting the second frequency band (or the second channel of the second frequency band). For example, based on a profile related to the second frequency band obtained from the external device 210, the processor 300 may control the first communication circuit 310 or the second communication circuit 302 to access another AP supporting the second frequency band. For example, the second frequency band may include a frequency band determined to be supported by the external device 210 based on the capability of the external device 210.

At operation 411, the electronic device (e.g., the processor 120 or 300) may perform the direct communication with the external device 210 through the second channel of the second frequency band. The processor 300 may establish the second frequency band (or the second channel of the second frequency band) for the direct communication with the external device 210 through negotiation with the external device 210. The processor 300 may control the first communication circuit 310 or the second communication circuit 320 to perform the WLAN communication with the external device 210 through the second channel of the second frequency band. According to an embodiment, the processor 300 may control the second communication circuit 320 to transmit and/or receive data with the AP1 200 and/or the external device 210 through the second channel of the second frequency band (e.g., about 5 GHz band).

Upon determining that the first frequency band is usable for the direct communication with the external device 210 (e.g., 'Yes' of operation 407), the electronic device (e.g., the processor 120 or 300) may perform, at operation 413, the direct communication with the external device 210 through the first channel of the first frequency band. The processor 300 may control the second communication circuit 320 to transmit and/or receive data with the AP1 200 and/or the external device 210 through the first channel of the first frequency band (e.g., about 6 GHz band).

Upon determining that the first frequency band is usable for the direct communication with the external device 210, the electronic device 101 may also transmit and/or receive data with the AP1 200 and/or the external device 210 through a third channel different from the first channel in the first frequency band. For example, the third channel of the first frequency band may be established through negotiation with the external device 210.

Upon determining to change the frequency band for the WLAN communication with the network infrastructure device (e.g., the AP1 200) to the second frequency band, the electronic device 101 may search whether there is an AP supporting the second frequency band. The electronic device (e.g., the processor 120 or 300) may select an AP to which the electronic device 101 accesses through the second frequency band, based on the communication quality of at least one AP detected by the search and/or the access history of the electronic device 101. The electronic device (e.g., the processor 120 or 300) may transmit and/or receive data by accessing the AP selected to be accessed by the electronic device 101 based on the second frequency band.

The electronic device 101 may output information related to a change in the frequency band for the WLAN communication with the network infrastructure device (e.g., the AP1 200). Upon changing the frequency band for the WLAN communication with the network infrastructure device (e.g., the AP1 200) to the second frequency band, the processor 300 may control a display (not shown) of the electronic device 101 to display information related to a change in the frequency band for the WLAN communication with the network infrastructure device (e.g., the AP1 200). Upon determining to change the frequency band for the WLAN communication with the network infrastructure device (e.g., the AP1 200) to the second frequency band, the processor 300 may control a display (not shown) of the electronic device 101 to display information related to a change in the frequency band for the WLAN communication with the network infrastructure device (e.g., the AP1 200). Upon receiving an input of accepting a change of the frequency band based on the information related to the change in the frequency band for the WLAN communication with the network infrastructure device (e.g., the AP1 200) displayed on the display, the processor 300 may control the first communication circuit 310 or the second communication circuit 320 to change the frequency band for the WLAN communication with the network infrastructure device (e.g., the AP1 200) to the second frequency band. Upon receiving an input of denying a change of the frequency band based on the information related to the change in the frequency band for the WLAN communication with the network infrastructure device (e.g., the AP1 200) displayed on the display, the processor 300 may control the first communication circuit 310 or the second communication circuit 320 to maintain the frequency band for the WLAN communication with the network infrastructure device (e.g., the AP1 200) to the first frequency band. For example, upon determining to maintaining the frequency band for the WLAN communication with the network infrastructure device (e.g., the AP1 200), the electronic device 101 may perform the WLAN communication with the AP1 200 through the first frequency band during a first time period, and perform the WLAN communication with the external device 210 through the second frequency band during a second time period different from the first time period.

Figure 5:
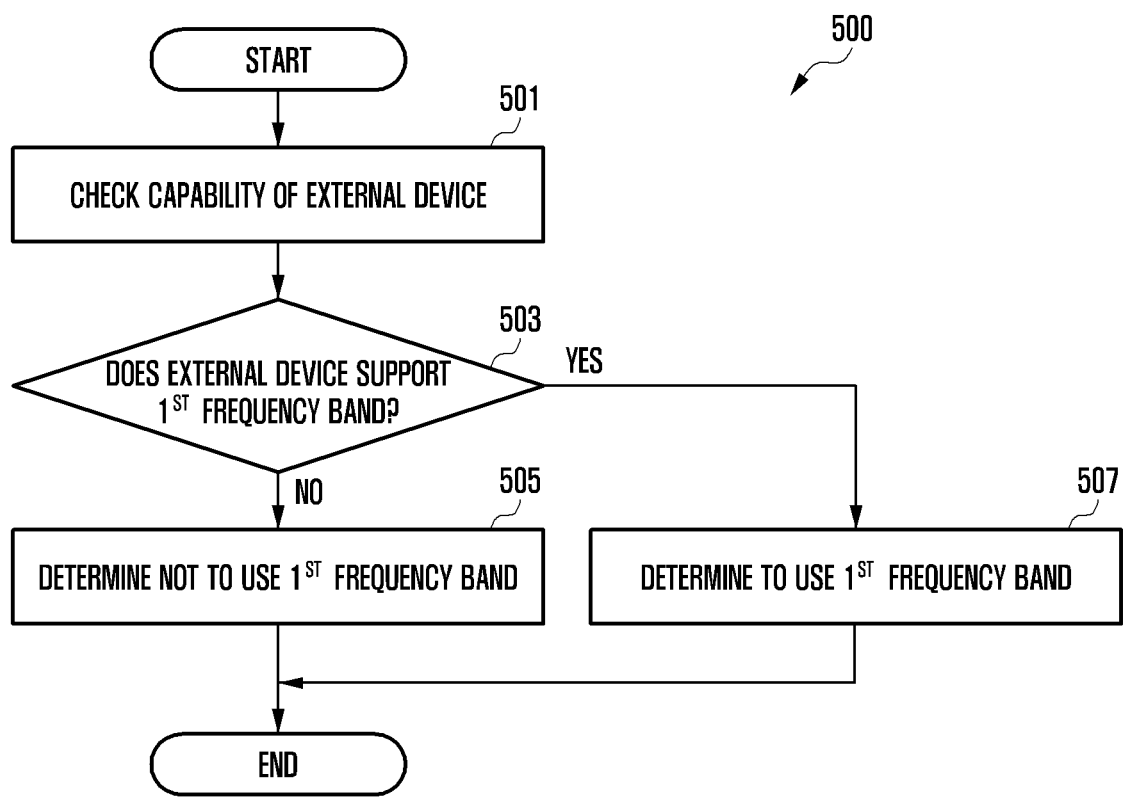
FIG. 5 is a flowchart for determining whether to use a frequency band based on capability of an external device in an electronic device according to an embodiment of the disclosure.

FIG. 5 is a flowchart 500 for determining whether to use a frequency band based on capability of an external device in an electronic device according to an embodiment of the disclosure.

Referring to FIG. 5, at least a part of FIG. 5 may include detailed operations of operation 407 in FIG. 4. The illustrated operations may be performed sequentially, but are not necessarily performed sequentially. For example, the order of the respective operations may be changed, and at least two operations may be performed in parallel. For example, the electronic device of FIG. 5 may be the electronic device 101 of FIG. 1, 2A, 2B, 2C, or 3.

Referring to FIG. 5, when the external device 210 for performing the WLAN-based direct communication is detected during the WLAN communication with the AP1 (e.g., 'Yes' of operation 403 in FIG. 4), the electronic device (e.g., the processor 120 in FIG. 1 or the processor 300 in FIG. 3) may check, at operation 501, the capability of the external device 210. The processor 300 may check the capability of the external device 210 based on a probe request message or a probe response message transmitted and/or received with the external device 210. When the external device 210 capable of the connection of the direct communication with the electronic device 101 is detected, the processor 300 may check the capability of the external device 210 through the OOB scheme.

At operation 503, the electronic device (e.g., the processor 120 or 300) may check whether the external device 210 supports a first frequency band (e.g., 6 GHz band), based on the capability of the external device 210. For example, the first frequency band may include a frequency band being used by the electronic device 101 for the WLAN communication with the AP1 200.

When the external device 210 does not support the first frequency band (e.g., 6 GHz band) (e.g., 'No' of operation 503), the electronic device (e.g., the processor 120 or 300) may determine not to use the first frequency band for the WLAN communication with the external device 210 at operation 505.

When the external device 210 supports the first frequency band (e.g., 6 GHz band) (e.g., 'Yes' of operation 503), the electronic device (e.g., the processor 120 or 300) may determine to use the first frequency band for the WLAN communication with the external device 210 at operation 507.

Figure 6:
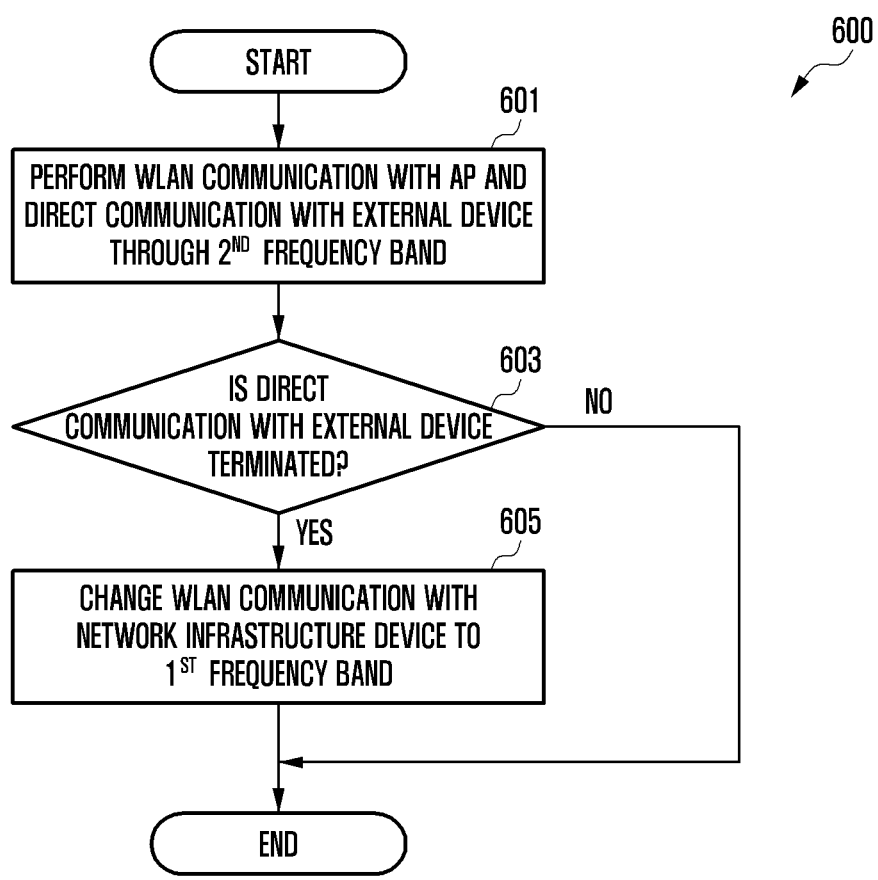
FIG. 6 is a flowchart for restoring a frequency band in an electronic device according to an embodiment of the disclosure.

FIG. 6 is a flowchart 600 for restoring a frequency band in an electronic device according to an embodiment of the disclosure.

Referring to FIG. 6, at least a part of FIG. 6 may include additional details of operations 409 and 411 in FIG. 4. The illustrated operations may be performed sequentially, but are not necessarily performed sequentially. For example, the order of the respective operations may be changed, and at least two operations may be performed in parallel. For example, the electronic device of FIG. 6 may be the electronic device 101 of FIG. 1, 2A, 2B, 2C, or 3.

Referring to FIG. 6, upon determining that the first frequency band being used for the WLAN communication with the AP1 200 is unusable for the direct communication with the external device 210 (e.g., 'No' of operation 407 in FIG. 4), the electronic device (e.g., the processor 120 in FIG. 1 or the processor 300 in FIG. 3) may perform the WLAN communication with the network infrastructure device and/or the external device 210 through a second channel of a second frequency band at operation 601. Upon determining that the first frequency band being used for the WLAN communication with the AP1 200 is unusable for the direct communication with the external device 210, the processor 300 may establish the second frequency band for the WLAN communication with the network infrastructure device and/or the external device 210. For example, based on the capability of the external device 210 and/or the WLAN connection information of the external device 210, the processor 300 may establish the second frequency band. For example, the processor 300 may establish the second frequency band through negotiation with the external device 210.

Based on establishing the second frequency band, the processor 300 may control the first communication circuit 310 or the second communication circuit 320 to change a frequency band for the WLAN communication with the network infrastructure device (e.g., the AP1 200) to the second frequency channel of the second frequency band. For example, the processor 300 may control the first communication circuit 310 or the second communication circuit 320 to access another AP supporting the second frequency band (e.g., about 5 GHz band) (or the second channel of the second frequency band). Based on establishing the second frequency band, the processor 300 may control the first communication circuit 310 or the second communication circuit 320 to perform the WLAN communication (e.g., direct communication) with the external device 210 through the second channel of the second frequency band. For example, based on establishing the second frequency band, the processor 300 may control the first communication circuit 310 or the second communication circuit 320 to transmit and/or receive data with another AP and/or the external device 210 through the second channel of the second frequency band (e.g., about 5 GHz band).

At operation 603, the electronic device (e.g., the processor 120 or 300) may check whether the direct communication with the external device 210 is terminated.

When the direct communication with the external device 210 is not terminated (e.g., 'No' of operation 603), the electronic device (e.g., the processor 120 or 300) may terminate the operation.

When the direct communication with the external device 210 is terminated (e.g., 'Yes' of operation 603), the electronic device (e.g., the processor 120 or 300) may change the frequency band for the WLAN communication with the network infrastructure device to the first frequency band at operation 605. When the connection of the direct communication with the external device 210 based on the second frequency band is released, the processor 300 may control the first communication circuit 310 or the second communication circuit 320 to change (or restore) the network infrastructure device performing the WLAN communication to the AP1 200 that supports the first frequency band (or the first channel of the first frequency band).

Figure 7:
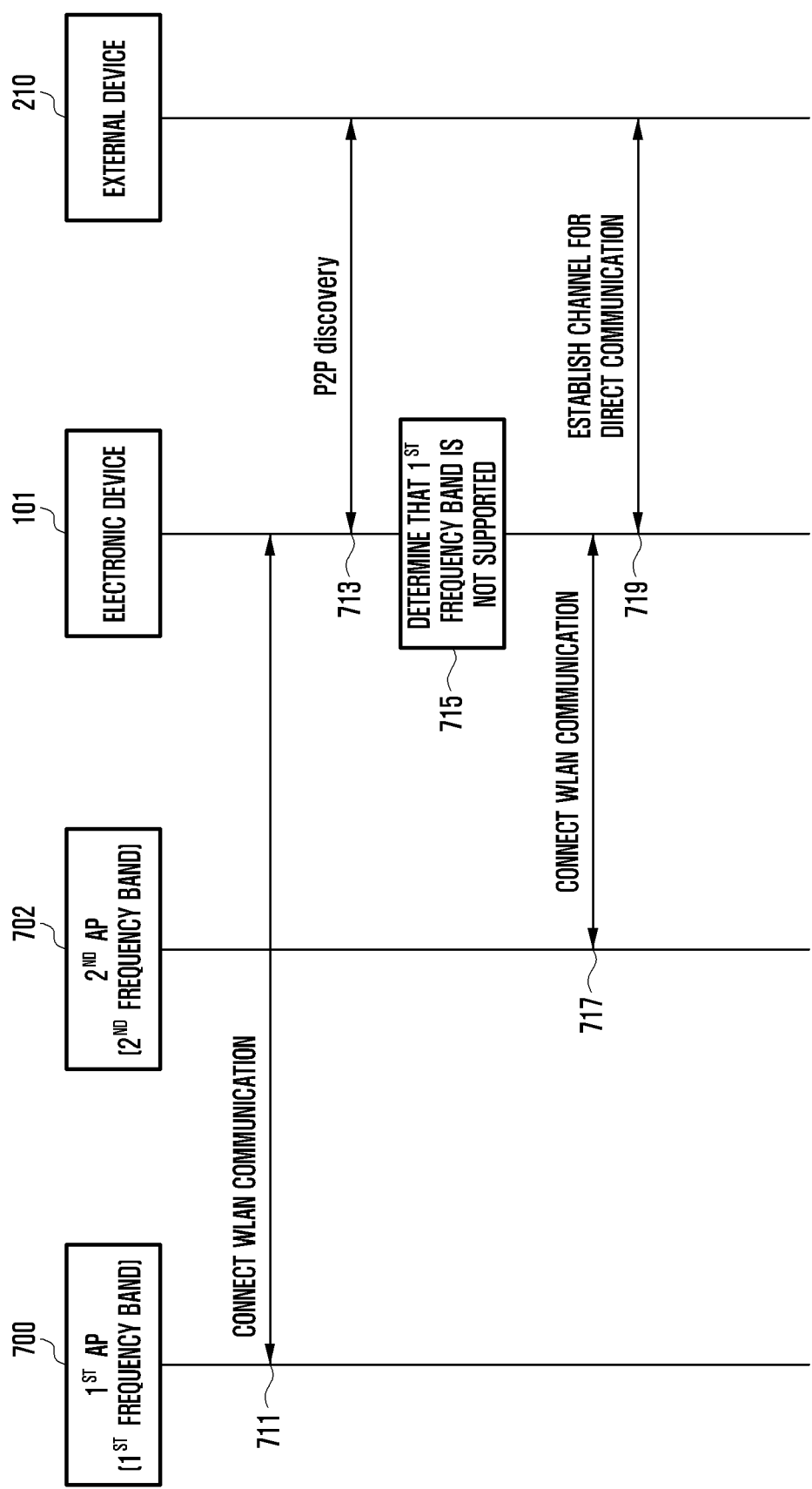
FIG. 7 illustrates one example for WLAN communication with a plurality of external devices in an electronic device according to an embodiment of the disclosure.

FIG. 7 illustrates one example for WLAN communication with a plurality of external devices in an electronic device according to an embodiment of the disclosure.

Referring to FIG. 7, a first AP 700 (e.g., the AP1 200 in FIG. 2A) may support a first frequency band, and a second AP 702 may support a second frequency band.

Referring to FIG. 7, the electronic device 101 may perform the WLAN communication with the first AP 700 through the first frequency band in operation 711. The electronic device 101 may transmit and/or receive data with the first AP 700 through a first channel of the first frequency band (e.g., about 6 GHz band). For example, the first frequency band and/or the first channel may be allocated from the first AP 700. For example, the first frequency band and/or the first channel may be established through negotiation with the AP1 200.

When the external device 210 for the direct communication based on the WLAN is detected during the WLAN communication with the first AP 700, the electronic device 101 may check the capability of the external device 210 in operation 713. When an application related to the WLAN-based direct communication is executed, the electronic device 101 may check, through the first communication circuit 310, the second communication circuit 320, or a separate short-range communication circuit (not shown), whether there is the external device 210 capable of the connection of the direct communication with the electronic device 101. When the external device 210 capable of the connection of the direct communication with the electronic device 101 is detected, the electronic device 101 may check the capability of the external device 210 through a peer-to-peer (P2P) discovery procedure with the external device 210. For example, the P2P discovery procedure may include a series of operations in which the electronic device 101 and the external device 210 transmit and/or receive a probe request message or a probe response message. When the external device 210 capable of the connection of the direct communication with the electronic device 101 is detected, the electronic device 101 may check the capability of the external device 210 through an out-of-band (OOB) scheme. For example, through the OOB scheme, the electronic device 101 may perform an operation of checking whether there is the external device 210 capable of the connection of the direct communication with the electronic device 101, and an operation of checking the capability and/or WLAN connection information of the external device 210. For example, the OOB scheme may include short-range communication such as NFC, Bluetooth, and/or BLE. For example, the OOB scheme may include short-distance communication such as NFC, Bluetooth, and/or BLE except for WLAN (or WLAN-based direct communication).

Based on the capability of the external device 210, the electronic device 101 may determine that the external device 210 does not support the first frequency band in operation 715.

Upon determining that the external device 210 does not support the first frequency band in operation 715, the electronic device 101 may perform the WLAN communication with the second AP 702 through the second frequency band in operation 717. Upon determining that the external device 210 does not support the first frequency band, the electronic device 101 may release the WLAN connection with the first AP 700 based on the first frequency band. Based on releasing the WLAN connection with the first AP 700, the electronic device 101 may perform the WLAN communication with the second AP 702 through the second frequency band. Upon determining that the external device 210 does not support the first frequency band, the electronic device 101 may perform the WLAN communication with the second AP 702 through the second frequency band. Based on performing the WLAN communication with the second AP 702 through the second frequency band, the electronic device 101 may release the WLAN connection with the first AP 700 based on the first frequency band. According to an embodiment, connecting the WLAN communication with the second AP 702 through the second frequency band and releasing the WLAN connection with the first AP 700 based on the first frequency band may be performed in parallel. For example, the second frequency band may include a frequency band supported by the electronic device 101 and the external device 210.

Upon determining that the external device 210 does not support the first frequency band in operation 715, the electronic device 101 may perform the WLAN communication (e.g., direct communication) with the external device 210 through the second frequency band in operation 719. Upon establishing the second frequency band as a frequency band for the direct communication with the external device 210 through negotiation with the external device 210, the electronic device 101 may connect the WLAN communication with the external device 210 through the second frequency band. For example, when negotiating with the external device 210, the electronic device 101 may transmit preference information related to the second frequency band to the external device 210. Based on use approval information related to the second frequency band from the external device 210, the electronic device 101 may determine that the second frequency band is established as a frequency band for the direct communication with the external device 210.

Figure 8:
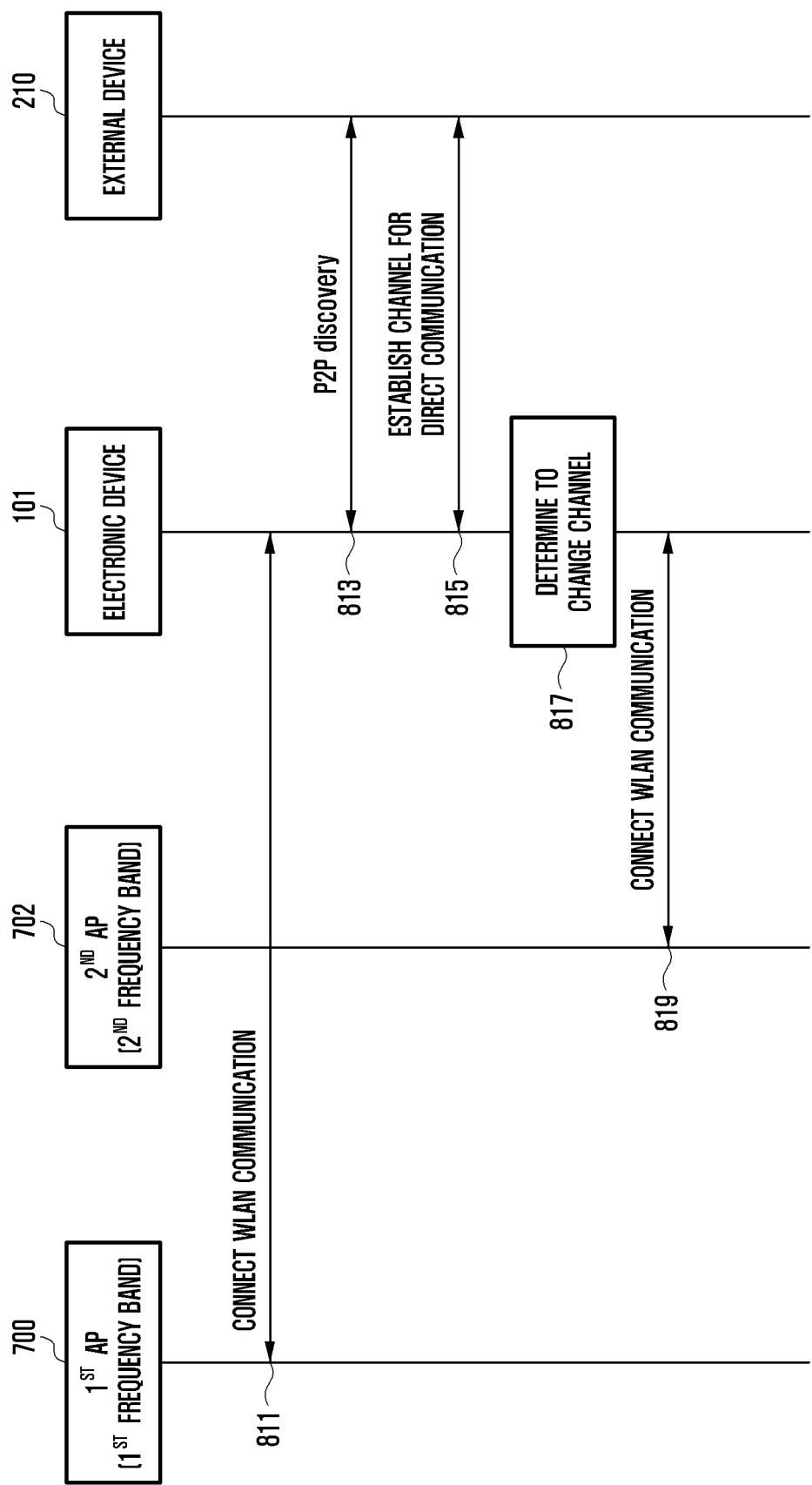
FIG. 8 illustrates another example for WLAN communication with a plurality of external devices in an electronic device according to an embodiment of the disclosure.

FIG. 8 illustrates another example for WLAN communication with a plurality of external devices in an electronic device according to an embodiment of the disclosure.

Referring to FIG. 8, the first AP 700 (e.g., the AP1 200 in FIG. 2A) may support the first frequency band, and the second AP 702 may support the second frequency band.

Referring to FIG. 8, the electronic device 101 may perform the WLAN communication with the first AP 700 through the first frequency band in operation 811. The electronic device 101 may transmit and/or receive data with the first AP 700 through the first channel of the first frequency band (e.g., about 6 GHz band). For example, the first frequency band and/or the first channel may be allocated from the first AP 700.

When the external device 210 for the WLAN-based direct communication is detected during the WLAN communication with the first AP 700, the electronic device 101 may check the capability of the external device 210 in operation 813. When the external device 210 capable of the connection of the direct communication with the electronic device 101 is detected through the OOB scheme, the electronic device 101 may check the capability of the external device 210 through the P2P discovery procedure with the external device 210. For example, the P2P discovery procedure may include a series of operations in which the electronic device 101 and the external device 210 transmit and/or receive a probe request message or a probe response message. Through the OOB scheme, the electronic device 101 may perform an operation of checking whether an external device 210 is capable of direct communication with the electronic device 101, and an operation of checking the capability and/or WLAN connection information of the external device 210.

The electronic device 101 may perform the WLAN communication with the external device 210 through the second frequency band established through negotiation with the external device 210 in operation 815. Upon determining that the external device 210 does not support the first frequency band based on the capability of the external device 210, the electronic device 101 may transmit preference information related to the second frequency band different from the first frequency band to the external device 210. The electronic device 101 may determine that the second frequency band is established as a frequency band for the direct communication with the external device 210, based on use approval information related to the second frequency band from the external device 210. Upon determining that the direct communication with the external device 210 is performed through the second frequency band, the electronic device 101 may connect the WLAN communication with the external device 210 through the second channel of the second frequency band.

Based on a frequency band (or channel) used for the WLAN connection with the external device 210, the electronic device 101 may determine whether to change a frequency band for the WLAN communication with the first AP 700 in operation 817.

Upon determining to change the frequency band for the WLAN communication with the first AP 700 in operation 817, the electronic device 101 may perform the WLAN communication with the second AP 702 through the second frequency band in operation 819. In the case of performing the WLAN communication with the external device 210 through the second frequency band, the electronic device 101 may release the WLAN connection with the first AP 700 based on the first frequency band, and perform the WLAN communication with the second AP 702 through the second frequency band. For example, connecting the WLAN communication with the second AP 702 through the second frequency band and releasing the WLAN connection with the first AP 700 based on the first frequency band may be performed sequentially or in parallel.

Upon determining that the external device 210 supports the first frequency band based on the capability of the external device 210, the electronic device 101 may transmit preference information related to the first frequency band to the external device 210. The electronic device 101 may determine that the first frequency band is established as a frequency band for the direct communication with the external device 210, based on use approval information related to the first frequency band from the external device 210. Upon determining to perform the direct communication with the external device 210 through the first frequency band, the electronic device 101 may perform the WLAN communication with the first AP 700 and/or the external device 210 through the first channel of the first frequency band.

Figure 9:
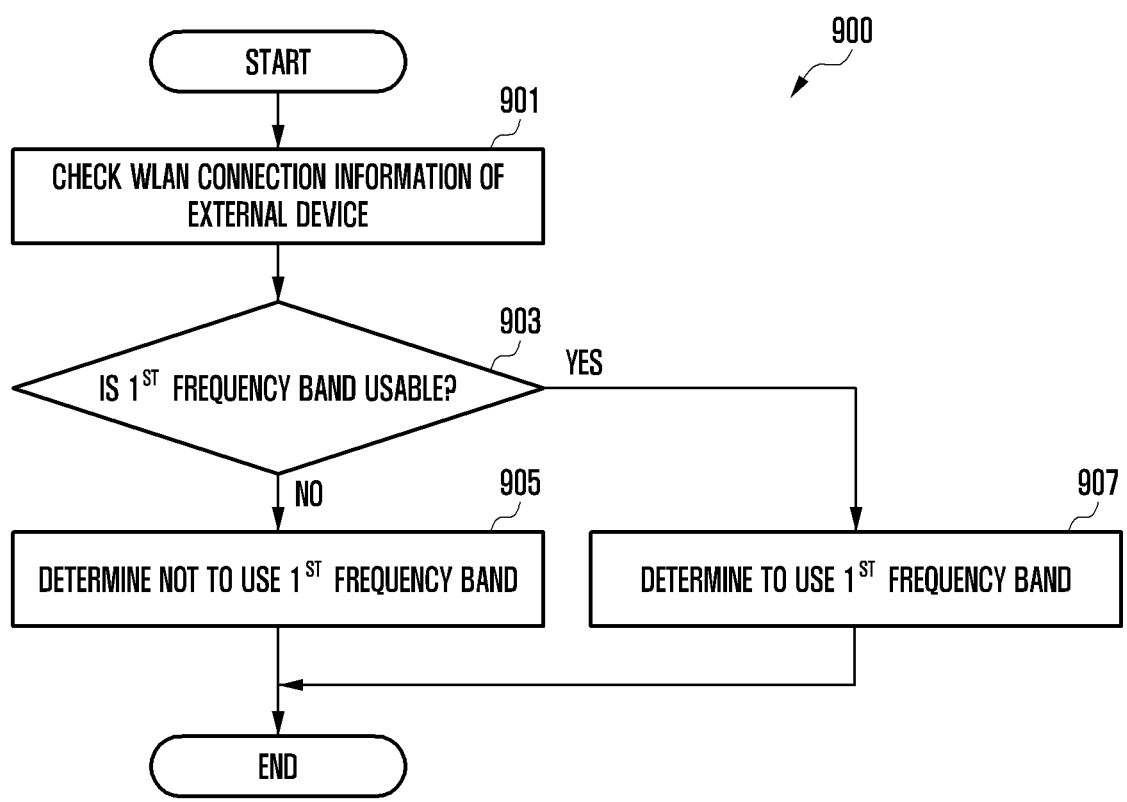
FIG. 9 is a flowchart for determining whether to use a frequency band based on WLAN connection information of an external device in an electronic device according to an embodiment of the disclosure.

FIG. 9 is a flowchart 900 for determining whether to use a frequency band based on WLAN connection information of an external device in an electronic device according to an embodiment of the disclosure.

Referring to FIG. 9, at least a part of FIG. 9 may include additional details of operation 407 in FIG. 4. The illustrated operations may be performed sequentially, but are not necessarily performed sequentially. For example, the order of the respective operations may be changed, and at least two operations may be performed in parallel. For example, the electronic device of FIG. 9 may be the electronic device 101 of FIG. 1, 2A, 2B, 2C, or 3.

Referring to FIG. 9, when the external device 210 for performing the WLAN-based direct communication is detected during the WLAN communication with the AP1 (e.g., 'Yes' of operation 403 in FIG. 4), the electronic device (e.g., the processor 120 in FIG. 1 or the processor 300 in FIG. 3) may check, at operation 901, the WLAN connection information of the external device 210. The processor 300 may check the WLAN connection information of the external device 210 based on a probe request message or a probe response message transmitted and/or received with the external device 210. For example, the WLAN connection information of the external device 210 may include information related to a frequency band and/or channel being used by the external device 210 for the WLAN communication. Through the OOB scheme, the processor 300 may perform an operation of checking whether there is the external device 210 capable of the connection of the direct communication with the electronic device 101, and an operation of checking the WLAN connection information of the external device 210.

At operation 903, based on the WLAN connection information of the external device 210, the electronic device (e.g., the processor 120 or 300) may check whether the external device 210 uses the first frequency band (e.g., 6 GHz band) for the WLAN communication with another external device (e.g., the AP2 220 in FIG. 2C). For example, the first frequency band may include a frequency band being used by the electronic device 101 for the WLAN communication with the AP1 200.

When the external device 210 does not use the first frequency band (e.g., 6 GHz band) for the WLAN communication with another external device (e.g., 'No' of operation 903), the electronic device (e.g., the processor 120 or 300) may determine, at operation 905, not to use the first frequency band for the WLAN communication with the external device 210. According to an embodiment, in the case of using the second frequency band lower than the first frequency band for the WLAN communication based on the WLAN connection information of the external device 210, the processor 300 may determine not to use the first frequency band for the WLAN communication with the external device 210.

When the external device 210 uses the first frequency band (e.g., 6 GHz band) for the WLAN communication with another external device (e.g., 'Yes' of operation 903), the electronic device (e.g., the processor 120 or 300) may determine, at operation 907, to use the first frequency band.

Upon determining not to use the first frequency band for the WLAN communication with the external device 210, the electronic device 101 may establish the second frequency band for the WLAN communication with the external device 210 and/or the network infrastructure device, based on the WLAN connection information of the external device 210 and/or the capability of the external device 210. The electronic device 101 may connect the WLAN communication for the direct communication with the external device 210, based on the second frequency band. The electronic device 101 may change the network infrastructure device for performing the WLAN communication from the AP1 200 supporting the first frequency band to another AP supporting the second frequency band (or the second channel of the second frequency band). For example, the electronic device 101 may perform the WLAN communication with another AP and/or the external device 210 substantially simultaneously through the second channel of the second frequency band.

Figure 10:
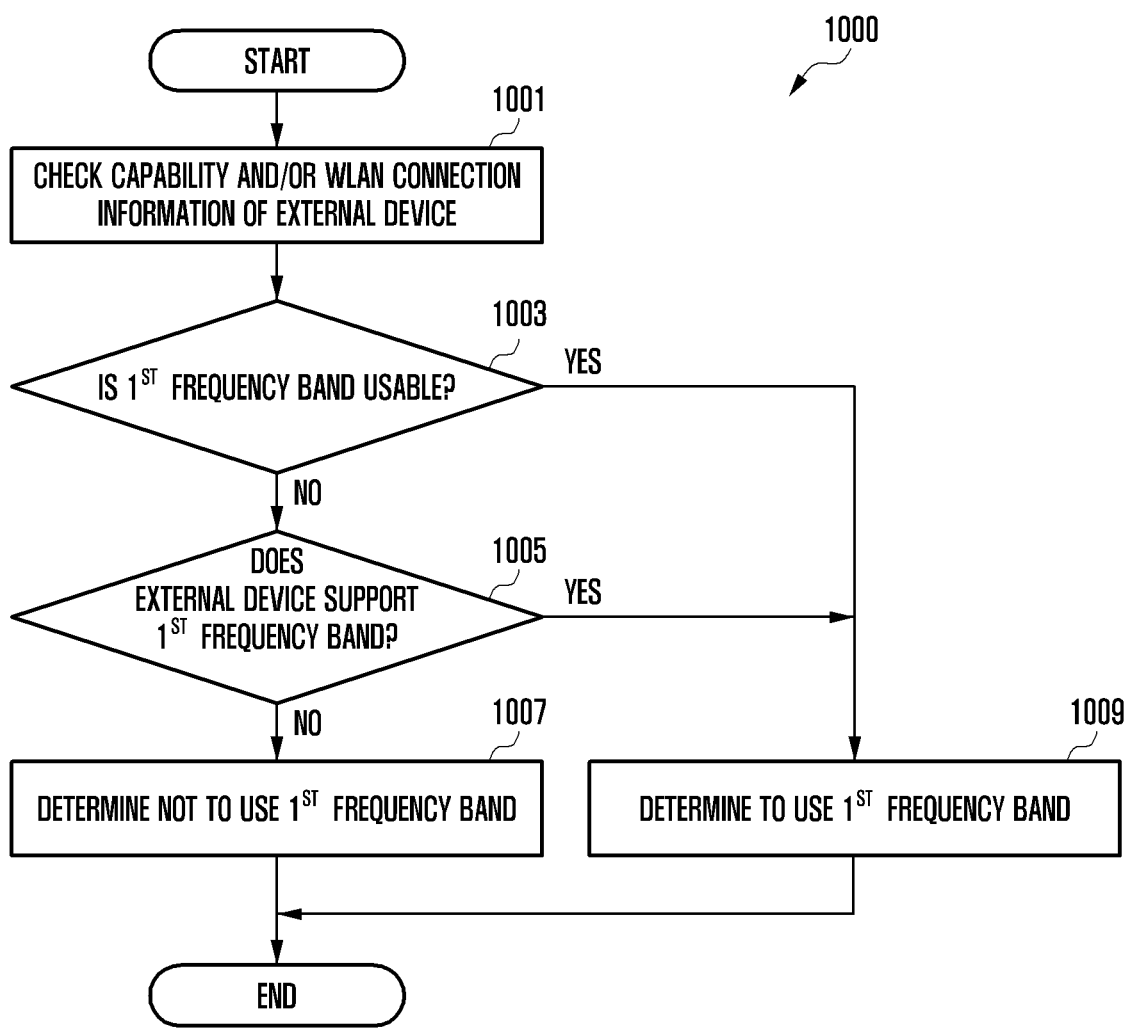
FIG. 10 is a flowchart for determining whether to use a frequency band based on capability of an external device and WLAN connection information of the external device in an electronic device according to an embodiment of the disclosure.

FIG. 10 is a flowchart 1000 for determining whether to use a frequency band based on capability of an external device and WLAN connection information of the external device in an electronic device according to an embodiment of the disclosure.

Referring to FIG. 10, at least a part of FIG. 10 may include additional details of operation 407 in FIG. 4. The illustrated operations may be performed sequentially, but are not necessarily performed sequentially. For example, the order of the respective operations may be changed, and at least two operations may be performed in parallel. For example, the electronic device of FIG. 10 may be the electronic device 101 of FIG. 1, 2A, 2B, 2C, or 3.

Referring to FIG. 10, when the external device 210 for performing the WLAN-based direct communication is detected during the WLAN communication with the AP1 (e.g., 'Yes' of operation 403 in FIG. 4), the electronic device (e.g., the processor 120 in FIG. 1 or the processor 300 in FIG. 3) may check, at operation 1001, the WLAN connection information of the external device 210. The processor 300 may check the WLAN connection information of the external device 210 based on a probe request message or a probe response message transmitted and/or received with the external device 210. For example, the WLAN connection information of the external device 210 may include information related to a frequency band and/or channel being used by the external device 210 for the WLAN communication. Through the OOB scheme, the processor 300 may perform an operation of checking whether an external device 210 is capable of the connection of direct communication with the electronic device 101, and an operation of checking the WLAN connection information of the external device 210.

At operation 1003, based on the WLAN connection information of the external device 210, the electronic device (e.g., the processor 120 or 300) may check whether the external device 210 uses the first frequency band (e.g., 6 GHz band) for the WLAN communication with another external device (e.g., the AP2 220 in FIG. 2C). For example, the first frequency band may include a frequency band being used by the electronic device 101 for the WLAN communication with the AP1 200.

When the external device 210 does not use the first frequency band (e.g., 6 GHz band) for the WLAN communication with another external device (e.g., 'No' of operation 1003), the electronic device (e.g., the processor 120 or 300) may check, at operation 1005, whether the external device 210 supports the first frequency band (e.g., 6 GHz band) based on the capability of the external device 210.

According to various embodiments, when the external device 210 does not support the first frequency band (e.g., 6 GHz band) (e.g., 'No' of operation 1005), the electronic device (e.g., the processor 120 or 300) may determine, at operation 1007, not to use the first frequency band for the WLAN communication with the external device 210. Upon determining that the external device 210 uses the second frequency band lower than the first frequency band for the WLAN communication with another external device (e.g., the AP1 200 in FIGS. 2A, 2B, and 2C or the AP2 220 in FIG. 2C) and does not support the first frequency band, based on the WLAN connection information of the external device 210, the processor 300 may determine not to use the first frequency band for the WLAN communication with the external device 210.

When the external device 210 uses the first frequency band (e.g., 6 GHz band) for the WLAN communication with another external device (e.g., 'Yes' of operation 1003), or when the external device 210 supports the first frequency band (e.g., 6 GHz band) (e.g., 'Yes' of operation 1005), the electronic device (e.g., the processor 120 or 300) may determine, at operation 1009, to use the first frequency band for the WLAN communication with the external device 210. Upon determining that the external device 210 uses the second frequency band lower than the first frequency band for the WLAN communication with another external device (e.g., the AP1 200 in FIGS. 2A, 2B, and 2C or the AP2 220 in FIG. 2C) but supports the first frequency band, based on the WLAN connection information of the external device 210, the processor 300 may determine to use the first frequency band for the WLAN communication with the external device 210.

Figure 11:
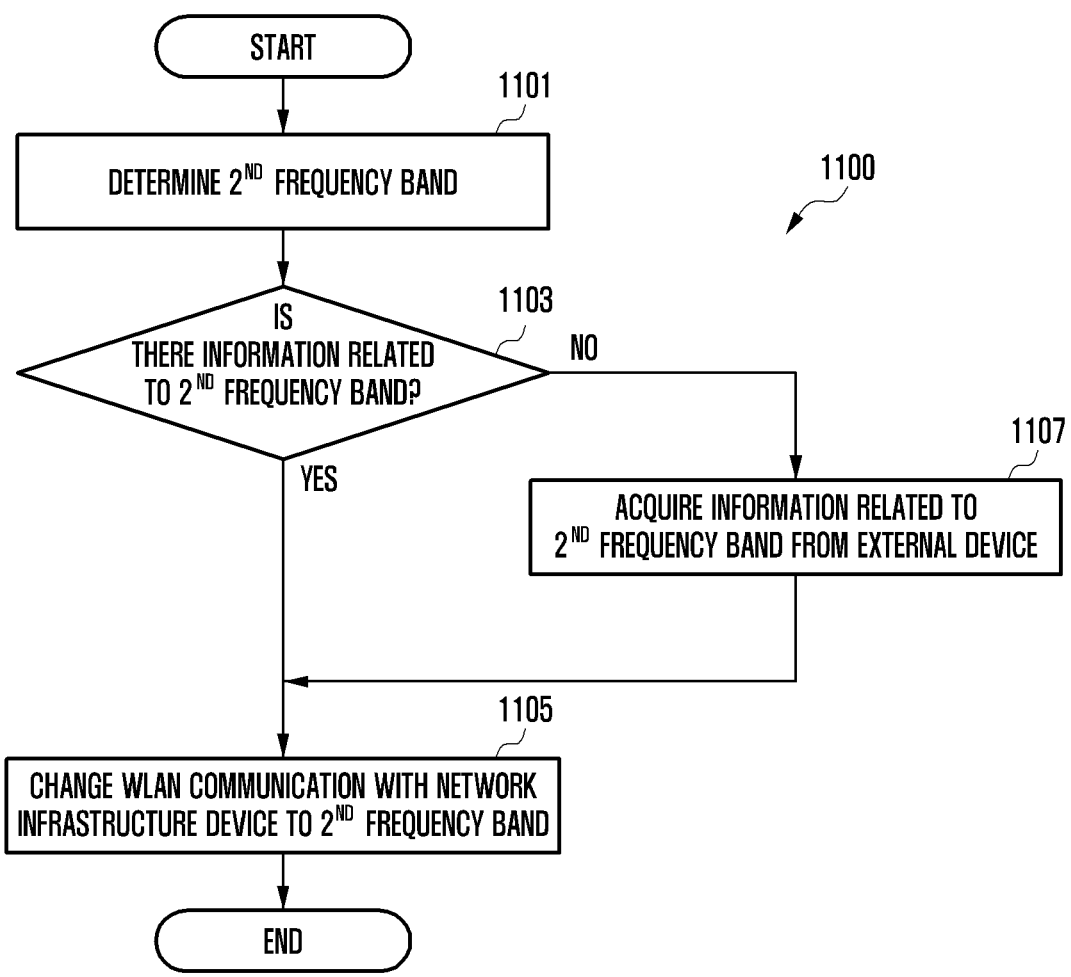
FIG. 11 is a flowchart for changing a frequency band for WLAN communication in an electronic device according to an embodiment of the disclosure.

FIG. 11 is a flowchart 1100 for changing a frequency band for WLAN communication in an electronic device according to an embodiment of the disclosure.

Referring to FIG. 11, at least a part of FIG. 11 may include additional details of operation 409 in FIG. 4. The illustrated operations may be performed sequentially, but are not necessarily performed sequentially. For example, the order of the respective operations may be changed, and at least two operations may be performed in parallel. For example, the electronic device of FIG. 11 may be the electronic device 101 of FIG. 1, 2A, 2B, 2C, or 3.

Referring to FIG. 11, upon determining not to use the first frequency band for the direct communication with the external device 210 (e.g., 'No' of operation 407 in FIG. 4), the electronic device (e.g., the processor 120 in FIG. 1 or the processor 300 in FIG. 3) may establish, at operation 1101, a frequency band for the WLAN communication with the external device 210 and/or the network infrastructure device to the second frequency band. The processor 300 may establish the second frequency band for the direct communication with the external device 210 through negotiation with the external device 210. Based on the WLAN connection information of the external device 210 and/or the capability of the external device 210, the processor 300 may establish the second frequency band for the WLAN communication with the external device 210 and/or the network infrastructure device.

At operation 1103, the electronic device (e.g., the processor 120 or 300) may check whether there is information related to the second frequency band in the memory 330. For example, the information related to the second frequency band may include a profile of another AP operating the second frequency band.

When the information related to the second frequency band exists in the memory 330 (e.g., 'Yes' of operation 1103), the electronic device (e.g., the processor 120 or 300) may change, at operation 1105, a frequency band for the WLAN communication with the network infrastructure device to the second frequency band, based on the information related to the second frequency band existing in the memory 330. Based on the information related to the second frequency band stored in the memory 330, the processor 300 may control the first communication circuit 310 or the second communication circuit 320 to access another AP supporting the second frequency band.

When the information related to the second frequency band does not exist in the memory 330 (e.g., 'No' of operation 1103), the electronic device (e.g., the processor 120 or 300) may acquire, at operation 1107, information related to the second frequency band from the external device 210.

At operation 1105, the electronic device (e.g., the processor 120 or 300) may change the frequency band for the WLAN communication with the network infrastructure device to the second frequency band, based on the information related to the second frequency band existing in the memory 330. Based on the information related to the second frequency band acquired from the external device 210, the processor 300 may control the first communication circuit 310 or the second communication circuit 320 to access another AP supporting the second frequency band.

Figure 12:
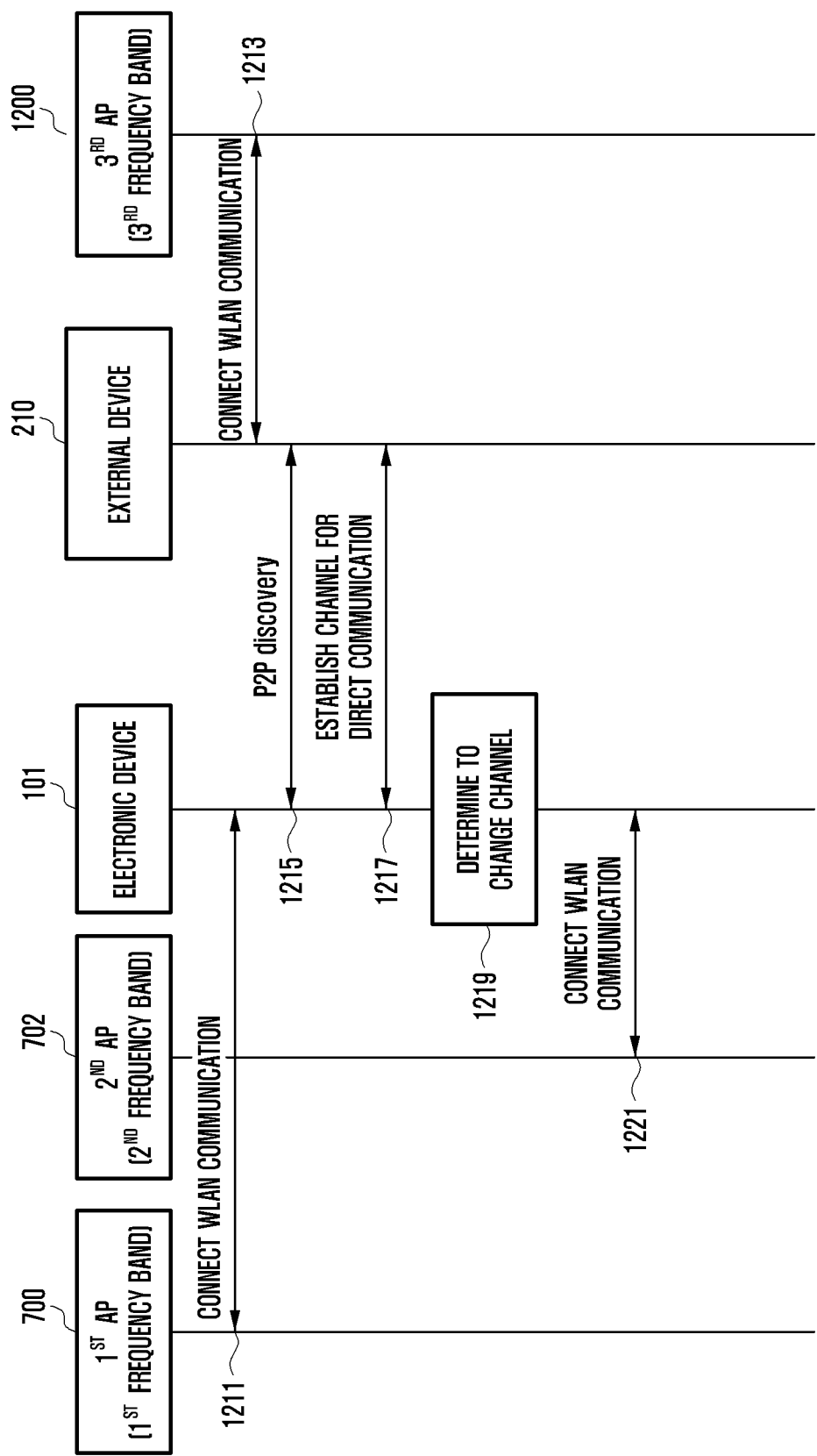
FIG. 12 illustrates still another example for WLAN communication with a plurality of external devices in an electronic device according to an embodiment of the disclosure.

FIG. 12 illustrates another example for WLAN communication with a plurality of external devices in an electronic device according to an embodiment of the disclosure.

Referring to FIG. 12, a first AP 700 (e.g., the AP1 200 in FIG. 2A) may support a first frequency band, and a second AP 702 may support a second frequency band.

Referring to FIG. 12, the electronic device 101 may perform the WLAN communication with the first AP 700 through the first frequency band in operation 1211. The electronic device 101 may transmit and/or receive data with the first AP 700 through a first channel of the first frequency band (e.g., about 6 GHz band). For example, the first frequency band and/or the first channel may be allocated from the first AP 700. For example, the first frequency band and/or the first channel may be established through negotiation with the AP1 200.

The external device 210 may perform the WLAN communication with a third AP 1200 through the second frequency band in operation 1213. The external device 210 may transmit and/or receive data with the third AP 1200 through a second channel of the second frequency band. For example, the second AP 702 may include the same AP as or different AP from the third AP 1200.

When the external device 210 for performing the WLAN-based direct communication is detected during the WLAN communication with the first AP 700, the electronic device 101 may check the capability of the external device 210 and/or the WLAN connection information of the external device 210 in operation 1215. When the external device 210 capable of the connection of the direct communication with the electronic device 101 is detected, the electronic device 101 may check the capability of the electronic device 210 and/or the WLAN connection information of the external device 210 through a P2P discovery procedure with the external device 210. For example, the P2P discovery procedure may include a series of operations in which the electronic device 101 and the external device 210 transmit and/or receive a probe request message or a probe response message. For example, the WLAN connection information of the external device 210 may include information related to a frequency band and/or channel for the WLAN communication between the external device 210 and the third AP 1200. When the external device 210 capable of the connection of the direct communication with the electronic device 101 is detected, the electronic device 101 may check the capability of the external device 210 through the OOB scheme.

The electronic device 101 may perform the WLAN communication with the external device 210 through the second frequency band established through negotiation with the external device 210 in operation 1217. Upon determining that the external device 210 does not support the first frequency band based on the capability of the external device 210, the electronic device 101 may transmit preference information related to the second frequency band used for the WLAN communication between the external device 210 and the third AP 1200 to the external device 210. The electronic device 101 may determine that the second frequency band is established as a frequency band for the direct communication with the external device 210, based on use approval information related to the second frequency band from the external device 210. Upon determining that the direct communication with the external device 210 is performed through the second frequency band, the electronic device 101 may connect the WLAN communication with the external device 210 through the second channel of the second frequency band.

Based on a frequency band (or channel) used for the WLAN connection with the external device 210, the electronic device 101 may determine whether to change a frequency band for the WLAN communication with the network infrastructure device (e.g., the first AP 700) (operation 1219).

Upon determining to change the frequency band for the WLAN communication with the network infrastructure device (e.g., the first AP 700) in operation 1219, the electronic device 101 may perform the WLAN communication with the second AP 702 through the second frequency band in operation 1221. In the case of performing the WLAN communication with the external device 210 through the second frequency band different from the first frequency band, the electronic device 101 may release the WLAN connection with the first AP 700 based on the first frequency band, and perform the WLAN communication with the second AP 702 through the second frequency band. For example, connecting the WLAN communication with the second AP 702 through the second frequency band and releasing the WLAN connection with the first AP 700 based on the first frequency band may be performed sequentially or in parallel.

When the external device 210 supports the first frequency band, the electronic device 101 may establish the first frequency band as a frequency band for the WLAN communication with the external device 210 through negotiation with the external device 210. The electronic device 101 may perform the WLAN communication with the external device 210 through the first frequency band established through negotiation with the external device 210. For example, the external device 210 may switch the WLAN communication with the third AP 1200 based on the second frequency band to the WLAN communication with the first AP 700 based on the first frequency band. The electronic device 101 may maintain the WLAN communication with the first AP 700 based on the first frequency band.

When the external device 210 for performing the WLAN-based direct communication is detected during the WLAN communication with the second AP 702 through the second frequency band (e.g., about 5 GHz band), the electronic device 101 may check the capability of the external device 210 and/or the WLAN connection information of the external device 210. When the external device 210 is performing the WLAN communication with the first AP 700 through the first frequency band higher than the second frequency band, the electronic device 101 may establish the first frequency band as a frequency band for the WLAN communication with the external device 210 through negotiation with the external device 210. The electronic device 101 may perform the WLAN communication with the external device 210 through the first frequency band established through negotiation with the external device 210. The electronic device 101 may switch the WLAN communication with the second AP 702 based on the second frequency band to the WLAN communication with the first AP 700 based on the first frequency band.

Figure 13:
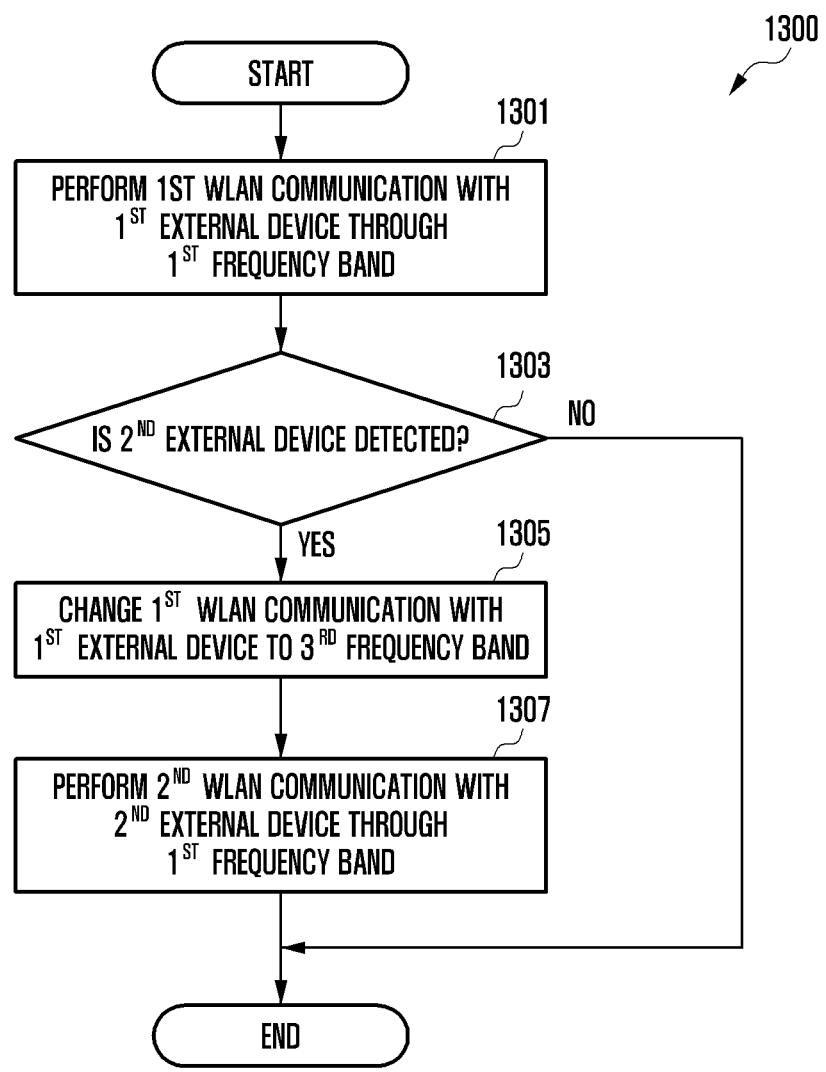
FIG. 13 is a flowchart for WLAN communication with a plurality of external devices through direct communication in an electronic device according to an embodiment of the disclosure.

FIG. 13 is a flowchart 1300 for WLAN communication with a plurality of external devices through direct communication in an electronic device according to an embodiment of the disclosure.

Referring to FIG. 13, the respective operations may be performed sequentially, but are not necessarily performed sequentially. For example, the order of the respective operations may be changed, and at least two operations may be performed in parallel. For example, the electronic device of FIG. 13 may be the electronic device 101 of FIG. 1, 2A, 2B, 2C, or 3.

Referring to FIG. 13, at operation 1301, the electronic device (e.g., the processor 120 in FIG. 1 or the processor 300 in FIG. 3) may perform first WLAN communication with a first external device through a first frequency band. The processor 300 may control the second communication circuit 320 to transmit and/or receive data with the first external device through the first frequency band (e.g., about 6 GHz band). The electronic device 101 may use an interface related to a software enabled access point (soft AP) for the WLAN communication with the external device 210. The external device 210 may use an interface related to a station (STA) for the WLAN communication with the electronic device 101. The electronic device 101 may use an interface related to a mobile hotspot for the WLAN communication with the external device 210. The external device 210 may use an interface related to a station (STA) for the WLAN communication with the electronic device 101. The electronic device 101 may use an interface related to a mobile AP for the WLAN communication with the external device 210. The external device 210 may use an interface related to a station (STA) for the WLAN communication with the electronic device 101.

At operation 1303, the electronic device (e.g., the processor 120 or 300) may check whether a second external device for performing the WLAN-based direct communication is detected during the first WLAN communication with the first external device. Through the OOB scheme, the processor 300 may determine whether the second external device for performing the WLAN-based direct communication is detected. For example, the OOB scheme may include short-range communication such as NFC, Bluetooth, and/or BLE. For example, the OOB scheme may include short-distance communication such as NFC, Bluetooth, and/or BLE except for WLAN (or WLAN-based direct communication).

When the second external device for performing the WLAN-based direct communication is not detected (e.g., 'No' of operation 1303), the electronic device (e.g., the processor 120 or 300) may terminate the procedure for the WLAN communication with a plurality of external devices through the direct communication.

When the second external device for performing the WLAN-based direct communication is detected (e.g., 'Yes' of operation 1303), the electronic device (e.g., the processor 120 or 300) may change, at operation 1305, the frequency band for the first WLAN communication with the first external device to a third frequency band (e.g., about 2.4 GHz band). When the second external device for the WLAN-based direct communication is detected during the first WLAN communication with the first external device, the processor 300 may check the capability of the second external device and/or the quality of service (QoS) for the direct communication with the second external device. For example, the capability of the second external device may be acquired based on a probe request message or a probe response message transmitted and/or received with the second external device. For example, the capability of the second external device may be acquired through the OOB scheme. For example, the QoS for the direct communication with the second external device may include the QoS required by an application related to the direct communication with the second external device. In the case of requiring the first frequency band for the second WLAN communication with the second external device based on the capability of the second external device and/or the QoS for the direct communication with the second external device, the processor 300 may control the first communication circuit 310 or the second communication circuit 320 to change the frequency band for the first WLAN communication with the first external device to the third frequency band. For example, the processor 300 may transmit a channel switch announcement (CSA) message including information related to a fifth channel of the third frequency band to the first external device and thereby change the frequency band for the first WLAN communication with the first external device to the third frequency band.

At operation 1307, the electronic device (e.g., the processor 120 or 300) may perform second WLAN communication (e.g., Wi-Fi Direct) with the second external device through the first frequency band. According to an embodiment, the processor 300 may control the first communication circuit 310 or the second communication circuit 320 to create an autonomous group owner (GO) in the first channel of the first frequency band and perform the first WLAN communication with the second external device. For example, the autonomous GO may include a series of operations in which the electronic device 101 acquires a right for the direct communication with the second external device without negotiation with the second external device.

The electronic device 101 may perform the first WLAN communication with the first external device through the second frequency band while performing the second WLAN communication with the second external device through the first frequency band, based on a multiple WLAN communication scheme (e.g., RSDB or DBS).

Figure 14:
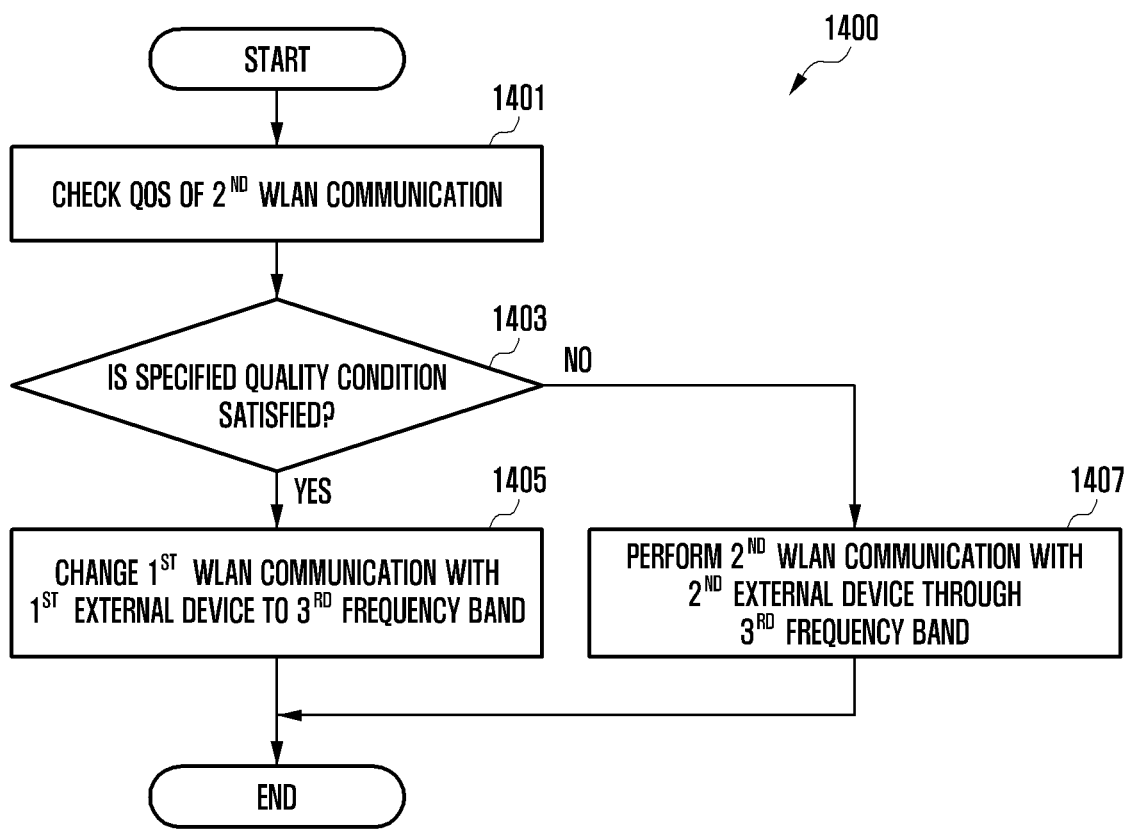
FIG. 14 is a flowchart for changing a frequency band based on service quality for WLAN communication with an external device in an electronic device according to an embodiment of the disclosure.

FIG. 14 is a flowchart 1400 for changing a frequency band based on service quality for WLAN communication with an external device in an electronic device according to an embodiment of the disclosure.

Referring to FIG. 14, at least a part of FIG. 14 may include detailed operations of operation 1305 in FIG. 13. In the illustrated embodiment, the respective operations may be performed sequentially, but are not necessarily performed sequentially. For example, the order of the respective operations may be changed, and at least two operations may be performed in parallel. For example, the electronic device of FIG. 14 may be the electronic device 101 of FIG. 1, 2A, 2B, 2C, or 3.

Referring to FIG. 14, when the second external device for performing the WLAN-based direct communication is detected during the first WLAN communication with the first external device (e.g., 'Yes' of operation 1303 in FIG. 13), the electronic device (e.g., the processor 120 in FIG. 1 or the processor 300 in FIG. 3) may check the QoS for the direct communication with the second external device at operation 1401. For example, the QoS for the direct communication with the second external device may include the QoS required by an application related to the direct communication with the second external device.

At operation 1403, the electronic device (e.g., the processor 120 or 300) may check whether the QoS for the direct communication with the second external device satisfies a specified quality condition. For example, the specified quality condition may include a condition predefined for determining whether to use the direct communication with the second external device based on the first frequency band (e.g., broadband).

When the QoS for the direct communication with the second external device satisfies the specified quality condition (e.g., 'Yes' of operation 1403), the electronic device (e.g., the processor 120 or 300) may change, at operation 1405, a frequency band for the first WLAN communication with the first external device to the third frequency band. For example, a state satisfying the specified quality condition may include a state in which the QoS for the direct communication with the second external device is higher than the QoS for the direct communication with the first external device. The processor 300 may control the first communication circuit 310 or the second communication circuit 320 to perform the second WLAN communication with the second external device through the first frequency band.

When the QoS for the direct communication with the second external device does not satisfy the specified quality condition (e.g., 'No' of operation 1403), the electronic device (e.g., the processor 120 or 300) may perform, at operation 1407, the second WLAN communication with the second external device through the third frequency band. For example, a state in which the specified quality condition is not satisfied may include a state in which the QoS for the direct communication with the first external device is higher than the QoS for the direct communication with the second external device.

When the QoS for the direct communication with the second external device does not satisfy the specified quality condition, the processor 300 may control the first communication circuit 310 or the second communication circuit 320 to maintain the first WLAN communication with the first external device based on the first frequency band.

FIG. 15 illustrates yet another example for WLAN communication with a plurality of external devices in an electronic device according to an embodiment of the disclosure.

Referring to FIG. 15, the electronic device 101 may include the first communication circuit 310 supporting the third frequency band (e.g., about 2.4 GHz band) and the second communication circuit 320 supporting the first frequency band (e.g., about 6 GHz band).

The electronic device 101 (or the second communication circuit 320) may perform the first WLAN communication with the first external device 1500 through the direct communication based on the first frequency band in operation 1511. For example, the first WLAN communication may include the WLAN communication using a soft AP scheme, a mobile AP scheme, or a mobile hotspot scheme.

The electronic device 101 may detect the second external device for performing the WLAN-based direct communication during the first WLAN communication with the first external device in operation 1513. When the second external device for the WLAN-based direct communication is detected during the first WLAN communication with the first external device in operation 1513, the electronic device 101 may check the capability of the second external device and/or the QoS for the direct communication with the second external device. Based on the capability of the second external device and/or the QoS for the direct communication with the second external device, the processor 300 may establish a frequency band required for the second WLAN communication with the second external device. For example, upon determining that the second external device supports the first frequency band and the QoS for the direct communication with the second external device satisfies the specified quality condition, the electronic device 101 may determine that the first frequency band is required for the direct communication with the second external device. For example, a state satisfying the specified quality condition may include a state in which the QoS for the direct communication with the second external device is higher than the QoS for the direct communication with the first external device. For example, upon determining that the second external device does not support the first frequency band or the QoS for the direct communication with the second external device does not satisfy the specified quality condition, the electronic device 101 may determine that the third frequency band is required for the direct communication with the second external device. For example, a state in which the specified quality condition is not satisfied may include a state in which the QoS for the direct communication with the first external device is higher than the QoS for the direct communication with the second external device.

In the case of requiring the first frequency band for the second WLAN communication with the second external device in operation 1513, the electronic device 101 may change the frequency band for the first WLAN communication with the first external device to the third frequency band in operation 1515. The electronic device 101 may perform the first WLAN connection with the first external device through the first communication circuit 310 supporting the third frequency band.

In the case of requiring the first frequency band for the second WLAN communication with the second external device 1502 in operation 1513, the electronic device 101 may connect the second WLAN communication with the second external device 1502 through the first frequency band in operation 1517. The electronic device 101 may perform the second WLAN connection with the second external device 1502 through the second communication circuit 320 supporting the first frequency band.

When the second WLAN communication with the second external device 1502 is terminated in operation 1519, the electronic device 101 may change (or restore) the frequency band for the first WLAN communication with the first external device to the first frequency band in operation 1521).

According to various embodiments of the disclosure, an operation method of an electronic device (e.g., the electronic device 101 in FIG. 1, 2A, 2B, 2C, or 3) may include performing wireless local area network (WLAN) communication with a first access point (AP) through a first channel of a first frequency band among a plurality of frequency bands supported by the electronic device, when an external device for performing WLAN-based direct communication is detected during the WLAN communication with the first AP, checking capability of the external device and/or WLAN connection information of the external device, switching the WLAN communication with the first AP to WLAN communication with a second AP based on a second channel of a second frequency band different from the first frequency band, based on the capability of the external device and/or the WLAN connection information of the external device, and performing direct communication with the external device through the second channel of the second frequency band.

The switching to the WLAN communication with the second AP may include determining whether to use the first frequency band for the direct communication with the external device, based on the capability of the external device and/or the WLAN connection information of the external device, and upon determining that the first frequency band is not used for the direct communication with the external device, switching the WLAN communication with the first AP to the WLAN communication with the second AP based on the second channel of the second frequency band.

The determining of whether to use the first frequency band may include determining not to use the first frequency band for the direct communication with the external device when the external device does not support the first frequency band based on the capability of the external device.

The method may further include determining to use the first frequency band for the direct communication with the external device when the external device supports the first frequency band based on the capability of the external device, and performing the direct communication with the external device through the first channel of the first frequency band, based on determining to use the first frequency band for the direct communication with the external device.

The method may further include, upon determining to use the first frequency band for the direct communication with the external device, maintaining WLAN connection with the first AP based on the first channel of the first frequency band.

The determining of whether to use the first frequency band may include checking a frequency band being used by the external device for WLAN communication with a third AP based on the WLAN connection information of the external device, and determining not to use the first frequency band for the WLAN communication with the external device when the frequency band being used by the external device for the WLAN communication with the third AP is different from the first frequency band.

The method may further include performing the direct communication with the external device through the first channel of the first frequency band when the external device uses the first frequency band for the WLAN communication with the third AP.

The method may further include displaying information related to switching to the WLAN communication with the second AP through a display in case of switching to the WLAN communication with the second AP.

The switching to the WLAN communication with the second AP may include displaying information related to switching to the WLAN communication with the second AP through the display upon determining to switch the WLAN communication with the first AP to the WLAN communication with the second AP based on the second channel of the second frequency band, and switching the WLAN communication with the first AP to the WLAN communication with the second AP based on the second channel of the second frequency band in response to an input corresponding to the information related to switching to the WLAN communication with the second AP displayed on the display.

The switching to the WLAN communication with the second AP may include acquiring a profile related to the second frequency band from the external device, and based on the profile related to the second frequency band acquired from the external device, switching the WLAN communication with the first AP to the WLAN communication with the second AP based on the second channel of the second frequency band.

A plurality of Aps that are network infrastructure devices may be physically integrated into one device. According to an embodiment of the disclosure, one physical device may include a plurality of APs supporting different frequency bands.

While the disclosure has been shown and described with reference to various embodiments thereof, it will be understood by those skilled in the art that various changes in form and details may be made therein without departing from the spirit and the scope of the disclosure as defined by the appended claims and their equivalents.

What is claimed is:

1. An electronic device comprising:
a wireless local area network (WLAN) communication circuit supporting a plurality of frequency bands;
at least one processor operatively connected to the WLAN communication circuit; and
memory storing instructions,
wherein the instructions, when executed by the at least one processor, cause the electronic device to:
perform WLAN communication with a first access point (AP) through a first channel of a first frequency band,
when an external device for performing WLAN-based direct communication is detected during the WLAN communication with the first AP, check at least one of a capability of the external device or WLAN connection information of the external device,
switch the WLAN communication with the first AP to WLAN communication with a second AP based on a second channel of a second frequency band different from the first frequency band, based on at least one of the capability of the external device or the WLAN connection information of the external device, and
perform direct communication with the external device through the second channel of the second frequency band.

2. The electronic device of claim 1, wherein the instructions, when executed by the at least one processor, cause the electronic device to:
determine whether to use the first frequency band for the direct communication with the external device, based on at least one of the capability of the external device or the WLAN connection information of the external device,
upon determining that the first frequency band is not used for the direct communication with the external device, switch the WLAN communication with the first AP to the WLAN communication with the second AP based on the second channel of the second frequency band, and
perform the direct communication with the external device through the second channel of the second frequency band.

3. The electronic device of claim 2, wherein the instructions, when executed by the at least one processor, cause the electronic device to:
determine not to use the first frequency band for the direct communication with the external device when the external device does not support the first frequency band based on the capability of the external device.

4. The electronic device of claim 3, wherein the instructions, when executed by the at least one processor, cause the electronic device to:
determine to use the first frequency band for the direct communication with the external device when the external device supports the first frequency band based on the capability of the external device, and
perform the direct communication with the external device through the first channel of the first frequency band while the WLAN communication with the first AP is maintained.

5. The electronic device of claim 4, wherein the instructions, when executed by the at least one processor, cause the electronic device to:
upon determining to use the first frequency band for the direct communication with the external device, maintain WLAN connection with the first AP based on the first channel of the first frequency band.

6. The electronic device of claim 2, wherein the instructions, when executed by the at least one processor, cause the electronic device to:
check a frequency band being used by the external device for WLAN communication with a third AP based on the WLAN connection information of the external device, and
determine not to use the first frequency band for the WLAN communication with the external device while the WLAN communication with the first AP is maintained when the frequency band being used by the external device for the WLAN communication with the third AP is different from the first frequency band.

7. The electronic device of claim 6, wherein the instructions, when executed by the at least one processor, cause the electronic device to:
perform the direct communication with the external device through the first channel of the first frequency band when the external device uses the first frequency band for the WLAN communication with the third AP.

8. The electronic device of claim 1, wherein the instructions, when executed by the at least one processor, cause the electronic device to:
acquire a profile related to the second frequency band from the external device, and based on the profile related to the second frequency band acquired from the external device, switch the WLAN communication with the first AP to the WLAN communication with the second AP based on the second channel of the second frequency band.

9. An operation method of an electronic device, the method comprising:
performing wireless local area network (WLAN) communication with a first access point (AP) through a first channel of a first frequency band among a plurality of frequency bands supported by the electronic device;
when an external device for performing WLAN-based direct communication is detected during the WLAN communication with the first AP, checking at least one of a capability of the external device or WLAN connection information of the external device;
switching the WLAN communication with the first AP to WLAN communication with a second AP based on a second channel of a second frequency band different from the first frequency band, based on at least one of the capability of the external device or the WLAN connection information of the external device; and
performing direct communication with the external device through the second channel of the second frequency band.

10. The method of claim 9, wherein the switching to the WLAN communication with the second AP comprises:
determining whether to use the first frequency band for the direct communication with the external device, based on at least one of the capability of the external device or the WLAN connection information of the external device; and
upon determining that the first frequency band is not used for the direct communication with the external device, switching the WLAN communication with the first AP to the WLAN communication with the second AP based on the second channel of the second frequency band.

11. The method of claim 10, wherein the determining of whether to use the first frequency band includes:
determining not to use the first frequency band for the direct communication with the external device when the external device does not support the first frequency band based on the capability of the external device.

12. The method of claim 11, further comprising:
determining to use the first frequency band for the direct communication with the external device when the external device supports the first frequency band based on the capability of the external device; and
performing the direct communication with the external device through the first channel of the first frequency band while the WLAN communication with the first AP is maintained.

13. The method of claim 12, further comprising:
upon determining to use the first frequency band for the direct communication with the external device, maintaining WLAN connection with the first AP based on the first channel of the first frequency band.

14. The method of claim 10, wherein the determining of whether to use the first frequency band comprises:
checking a frequency band being used by the external device for WLAN communication with a third AP based on the WLAN connection information of the external device, and
determining not to use the first frequency band for the WLAN communication with the external device while the WLAN communication with the first AP is maintained when the frequency band being used by the external device for the WLAN communication with the third AP is different from the first frequency band.

15. The method of claim 14, further comprising:
performing the direct communication with the external device through the first channel of the first frequency band when the external device uses the first frequency band for the WLAN communication with the third AP.

16. The method of claim 9, wherein the switching to the WLAN communication with the second AP comprises:
acquiring a profile related to the second frequency band from the external device, and
based on the profile related to the second frequency band acquired from the external device, switching the WLAN communication with the first AP to the WLAN communication with the second AP based on the second channel of the second frequency band.

* * * * *